(12) United States Patent
Aichi et al.

(10) Patent No.: US 10,304,606 B2
(45) Date of Patent: May 28, 2019

(54) COIL ASSEMBLY, STRUCTURE FOR ATTACHING COIL ASSEMBLY, AND ELECTRICAL CONNECTION BOX

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

(72) Inventors: Junya Aichi, Mie (JP); Yoshikazu Sasaki, Mie (JP); Kyungwoo Kim, Mie (JP); Shigeki Yamane, Mie (JP); Takehito Kobayashi, Mie (JP); Yukinori Kita, Mie (JP); Tomohiro Ooi, Mie (JP); Toru Takahashi, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi (JP)

( * ) Notice: Subject to any disclaimer, the term of this patent is extended or adjusted under 35 U.S.C. 154(b) by 138 days.

(21) Appl. No.: 15/321,943

(22) PCT Filed: Apr. 28, 2015

(86) PCT No.: PCT/JP2015/062834
§ 371 (c)(1),
(2) Date: Dec. 23, 2016

(87) PCT Pub. No.: WO2016/002326
PCT Pub. Date: Jan. 7, 2016

(65) Prior Publication Data
US 2017/0140863 A1    May 18, 2017

(30) Foreign Application Priority Data

Jul. 4, 2014 (JP) .................................. 2014-138428

(51) Int. Cl.
*H01F 27/06* (2006.01)
*H01F 17/04* (2006.01)
(Continued)

(52) U.S. Cl.
CPC ......... *H01F 17/045* (2013.01); *H01F 27/022* (2013.01); *H01F 27/06* (2013.01);
(Continued)

(58) Field of Classification Search
CPC ................................................. H01F 27/00–36
(Continued)

(56) References Cited

U.S. PATENT DOCUMENTS

2011/0215891 A1   9/2011   Sundstrom et al.
2015/0213938 A1   7/2015   Sakaguchi et al.

FOREIGN PATENT DOCUMENTS

EP    2874162 A1    5/2015
JP    2000173840 A    6/2000
(Continued)

OTHER PUBLICATIONS

European Search Report for PCT/JP2015062834 dated Nov. 30, 2016.

*Primary Examiner* — Tuyen T Nguyen
(74) *Attorney, Agent, or Firm* — Honigman LLP

(57) ABSTRACT

A coil assembly includes a coil unit in which a coil obtained by winding a winding wire is disposed around a magnetic core, a coil case that accommodates the coil unit, and a potting material with which an inside of the coil case is filled, and the coil case has an elastic fixing portion that is attachable to a resin member to which the coil case is to be fixed. The above-described configuration makes it possible to provide a coil assembly that is unlikely to crack and generate abnormal noises.

15 Claims, 25 Drawing Sheets

(51) Int. Cl.
　　　*H02G 3/16*　　　(2006.01)
　　　*H01F 27/02*　　(2006.01)
　　　*H01F 27/30*　　(2006.01)
　　　*H01F 27/28*　　(2006.01)

(52) U.S. Cl.
　　　CPC ....... *H01F 27/2823* (2013.01); *H01F 27/306* (2013.01); *H02G 3/16* (2013.01); *H01F 2017/046* (2013.01)

(58) Field of Classification Search
　　　USPC .................................. 336/65, 83, 90, 92, 96
　　　See application file for complete search history.

(56) References Cited

FOREIGN PATENT DOCUMENTS

| | | | |
|---|---|---|---|
| JP | 2013125857 | A | 6/2013 |
| WO | 2014010749 | A1 | 1/2014 |

COIL ASSEMBLY, STRUCTURE FOR ATTACHING COIL ASSEMBLY, AND ELECTRICAL CONNECTION BOX

CROSS-REFERENCE TO RELATED APPLICATIONS

This application is the U.S. national stage of PCT/JP2015/062834 filed Apr. 28, 2015, which claims priority of Japanese Patent Application JP 2014-138428 filed Jul. 4, 2014.

FIELD OF THE INVENTION

A technique disclosed in this specification relates to a coil assembly, a structure for attaching a coil assembly, and an electrical connection box.

BACKGROUND OF THE INVENTION

Conventionally, examples of a transformer in which a coil unit is sandwiched between paired cores include a transformer in which a toric coil unit is disposed around a cylindrical protrusion of a pair of ferrite cores called "PQ core".

Examples of a method for fixing the above-described transformer to a case accommodating a circuit board include a method of pressing one end of a pair of plate springs against a ceiling portion of the core of the transformer and screwing the other end to a screw table provided on the case. However, the above-described fixing method is problematic in that the core easily cracks due to a strong force being locally applied to only a location at which the plate spring is in contact with the core, and thus the fixing method needs to be improved.

Also, the fixing method is problematic in that abnormal noises are generated by air vibration between the ferrite core and the coil due to magnetostriction.

An object of a technique disclosed in this specification is to provide a coil assembly, a structure for attaching a coil assembly, and an electrical connection box according to which a magnetic core is unlikely to crack and abnormal noises are unlikely to be generated.

SUMMARY

A technique disclosed in this specification is a coil assembly including a coil unit in which a coil obtained by winding a winding wire is disposed around a magnetic core, a coil case that accommodates the coil unit, and a potting material with which an inside of the coil case is filled, in which the coil case has an elastic fixing portion that is attachable to a resin member to which the coil case is to be fixed.

This configuration has the following effects. In general, if a component is to be fixed forcibly, the component warps due to a dimensional error of the component and an excessive force is applied to the component. In this configuration, the coil unit is fixed to the resin member via the coil case. Therefore, warping caused by a dimensional error of a component or an error in an assembling position can be absorbed between the coil case and the coil unit. Therefore, compared to a coil unit that is directly fixed to the resin member, it is possible to prevent a strong force from being applied to the coil unit and the magnetic core of the coil unit is unlikely to crack. Moreover, since the fixing portion of the coil case has elasticity, warping can also be absorbed by the fixing portion. Therefore, the magnetic core is less likely to crack.

Since air vibration caused by magnetostriction is eliminated due to a configuration in which the inside of the coil case is filled with the potting material, abnormal noises are unlikely to be generated. Moreover, the coil unit does not rattle inside the coil case.

An embodiment of a coil assembly includes the following configurations.

The coil case has a positioning portion for positioning with respect to the resin member, and the positioning portion is provided on an opening end of the coil case. This makes it possible to suppress shifting the relative position of the coil case to the resin member. Also, since the positioning portion is provided on the opening end, the opening end is unlikely to warp, compared to the case where no positioning portions are provided.

The positioning portion is constituted by flanges provided on a bottom wall (a wall opposing the resin member) of the coil case and a side wall, which is orthogonal to the bottom wall, of the coil case. This configuration makes it possible to position the coil case at two locations, namely, at the bottom wall and the side wall. Also, since the positioning portion is configured by the flanges, the opening end of the coil case can be effectively reinforced. Therefore, the positioning portion has an increased effect of suppressing warping of the opening end of the coil case.

The flange of the bottom wall has a recess that fits in the resin member. This configuration makes it possible to position the coil case on the resin member by the recess fitting in the resin member.

The fixing portion is provided integrally with the coil case. This configuration makes it possible to reduce the number of components, compared to the case where the fixing portion is provided separately.

The magnetic core has a columnar winding portion, the winding wire is a flat wire, and the coil is an edgewise coil obtained by winding the flat wire edgewise around the winding portion.

The coil assembly may have a structure in which the coil assembly is attached to the resin member by fixing the fixing portion to an attachment portion provided on the resin member, a connection portion that has a rectangular plate shape and is fastened to a counterpart connection portion with a bolt and a square nut is provided on the winding wire of the coil assembly, and the square nut is installed on the resin member and is inclined relative to a direction in which the connection portion extends.

A length of a diagonal line of the square nut is longer than a length of one side. Therefore, if the square nut is inclined, a corner of the square nut protrudes outwardly from the connection portion of the winding wire by setting the width of one side of the square nut approximately equal to the width of the connection portion, and thus holding the protruding corner makes it possible to hold the square nut.

Thus, compared to the case where the square nut is disposed without inclination, the square nut having a smaller width can be adopted, leading to a reduction in the weight of the entire coil assembly.

Also, the resin member is a coil rest and may have a configuration in which the square nut is held on the coil rest.

Moreover, the resin member is a coil rest and may have a configuration in which the fixing portion is attached to the attachment portion provided on the coil rest.

Furthermore, a technique disclosed in this specification is applicable to the above-described coil assembly and an electrical connection box having a structure for attaching a coil assembly.

According to a technique disclosed in this specification, it is possible to provide a coil assembly, a structure for attaching a coil assembly, and an electrical connection box according to which cracks are unlikely to occur and abnormal noises are unlikely to be generated.

DETAILED DESCRIPTION

Embodiment 1 will be described with reference to FIGS. 1 to 21.

Figure 1:
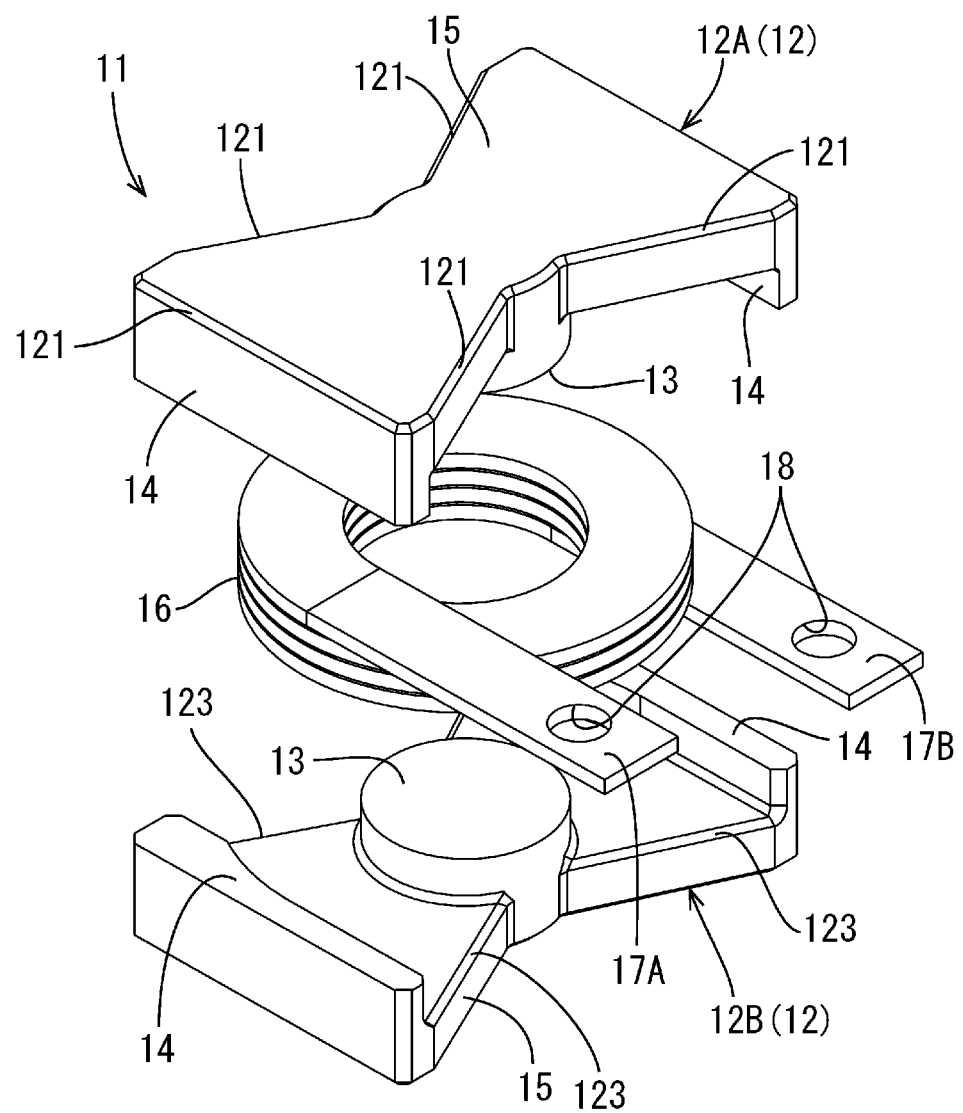
FIG. 1 is an exploded perspective view of a choke coil of Embodiment 1.
Figure 2:
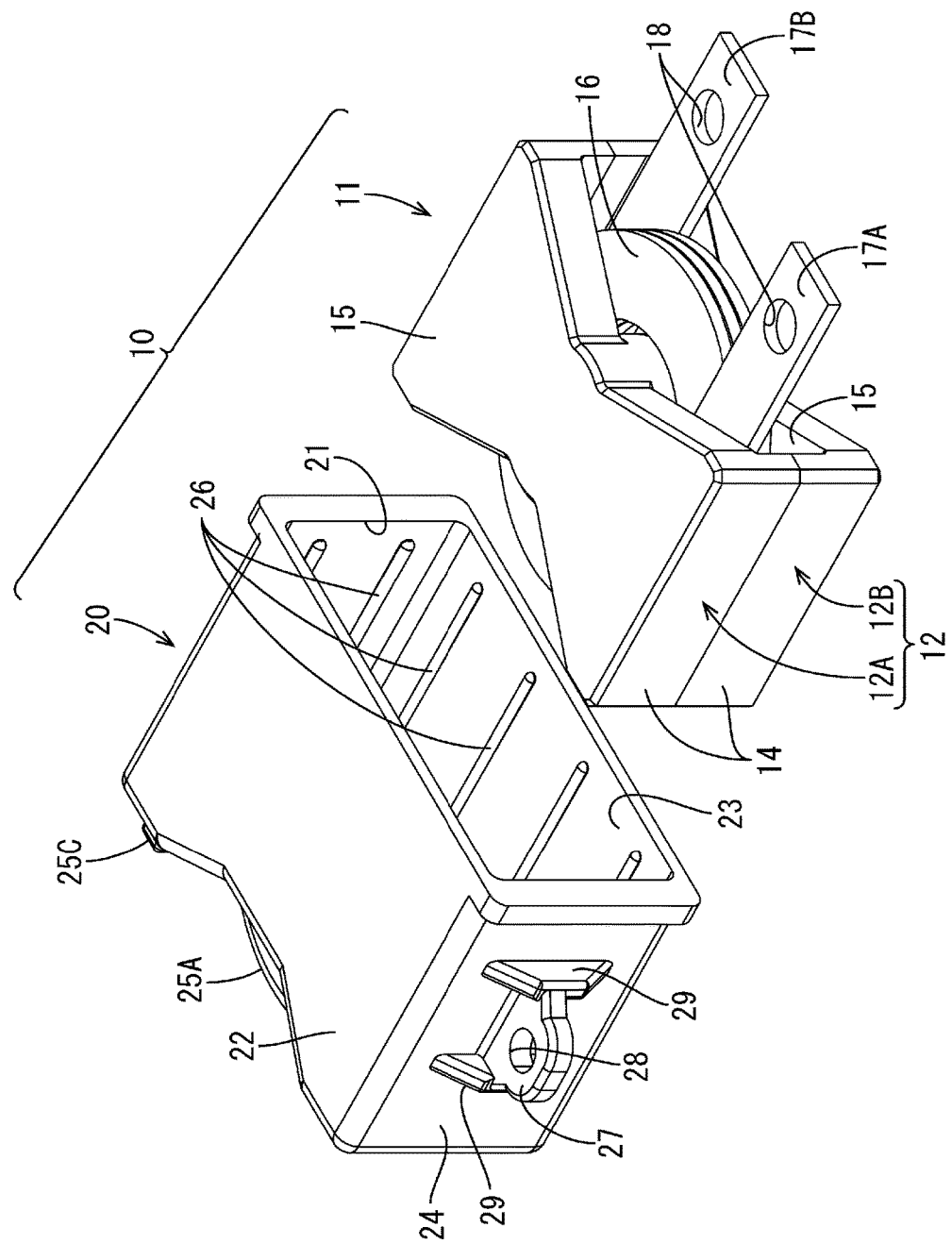
FIG. 2 is a perspective view of the choke coil and a coil case.
Figure 12:
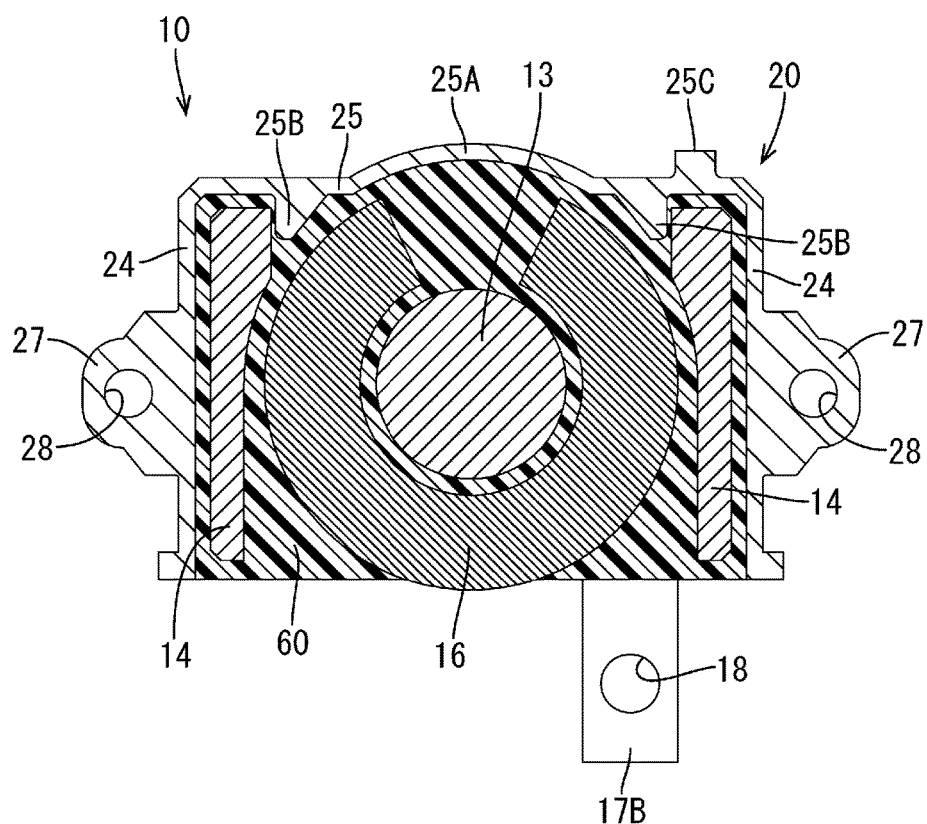
FIG. 12 is a cross-sectional view taken along B-B in FIG. 7 in a state in which the coil case is filled with a potting material.
Figure 13:
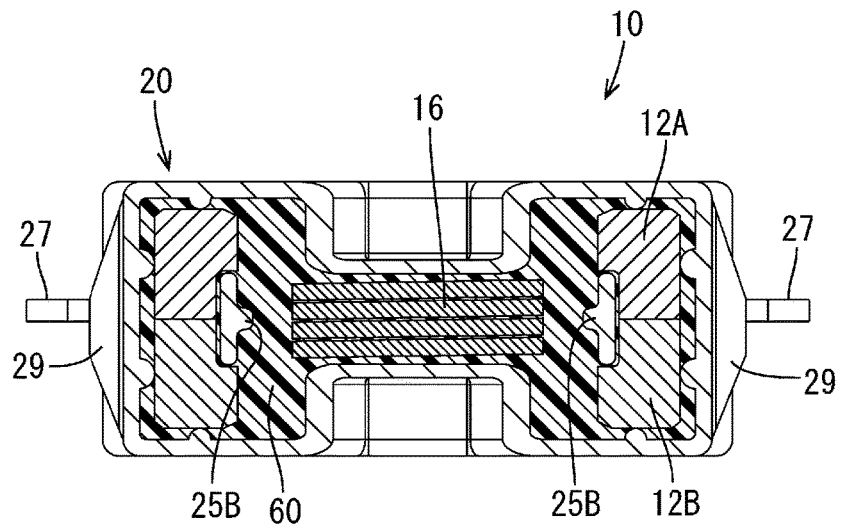
FIG. 13 is a cross-sectional view taken along C-C in FIG. 9 in a state in which the coil case is filled with a potting material.

A coil assembly 10 of the present embodiment includes a choke coil (an example of a coil unit) 11, a coil case 20 that accommodates the choke coil 11, and a potting material 60 filled into the coil case 20 (see FIGS. 1, 2, and 12). Hereinafter, in the following description, the terms "top", "bottom", "right", "left", "front", and "rear" respectively refer to the up, down, right back, left front, right front, and left back in FIG. 2.

The choke coil 11 has a magnetic core 12 and an edgewise coil 16. The magnetic core 12 is a so-called PQ core, and as shown in FIG. 1, includes a pair of a first core 12A and a second core 12B that have the same shape and are mounted to each other. The first core 12A and the second core 12B has a cylindrical winding portion 13, a pair of approximately plate-shaped legs 14 that sandwich the winding portion 13 and extend in parallel to each other in the axial direction of the winding portion 13, and plate-shaped connection portions 15 formed by connecting the winding portion 13 and one end portion of the pair of legs 14 to each other. The winding portion 13 and the legs 14 are made to have an equal height with respect to the connection portion 15. Also, those two side edges of the connection portions 15 that are not connected to the legs 14 are obliquely cut out from the two end portions of the legs 14 toward the winding portion 13.

Also, as shown in FIG. 1, an outer circumferential end portion 121 and an inner circumferential end portion 123 of the magnetic cores 12A and 12B have a shape in which edges are obliquely cut off, that is, they have a chamfered shape. The chamfered shape of the end portions 121 and 123 makes it possible to suppress cracking of the potting material 60 filled into the coil case 20 with the end portions 121 and 123 as the starting points, due to thermal stress. Note that instead of the chamfered shape, the shape of the end portions 121 and 123 may also be a rounded shape (arc shape).

The edgewise coil 16 is a coil in which a flat wire is used for the winding wire. The edgewise coil 16 is a coil obtained by winding the flat wire edgewise, or in other words, a coil obtained by longitudinal winding. As shown in FIG. 1, both end portions of the edgewise coil 16 extend in parallel to each other in the same direction to form a pair of connection portions 17A and 17B, and connection holes 18 are formed near these end portions, passing through the edgewise coil 16. The pair of connection portions 17A and 17B extend at different heights.

The edgewise coil 16 is disposed around the winding portion 13 of the pair of first core 12A and second core 12B, and accordingly, the edgewise coil 16 forms the choke coil 11 together with the magnetic core 12.

Figure 3:
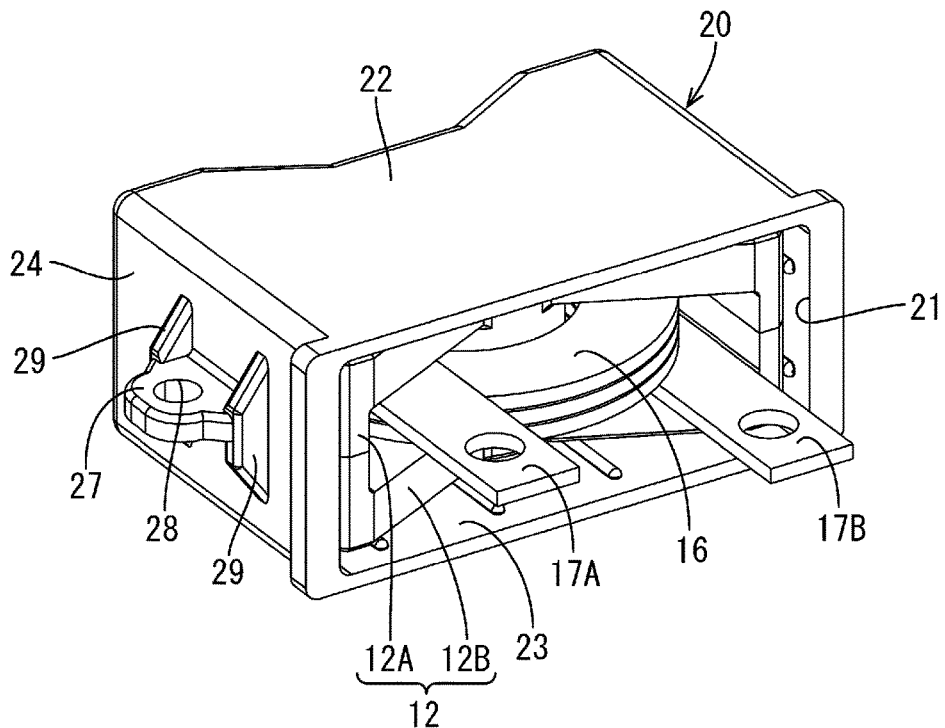
FIG. 3 is a perspective view of a state in which the coil case accommodates the choke coil.

As shown in FIG. 3, the choke coil 11 is accommodated in the coil case 20.

The coil case 20 is made of a synthetic resin, and as shown in FIG. 2, is constituted by an open box with an opening 21 on one side (the front side). Specifically, the coil case 20 has an upper wall 22 and a bottom wall 23 extending along the upper surface and the lower surface of the choke coil 11, side walls 24 extending along left and right side surfaces (legs 14) of the choke coil 11, and a rear wall 25 extending along the back surface of the choke coil 11. Note that the bottom wall 23 of the coil case 20 faces the bottom of a coil rest 32, which will be described later.

Rear edges of the upper wall 22 and the bottom wall 23 are obliquely cut out inwardly in the vicinity of the centers thereof along side edges of the connection portions 15 of the choke coil 11, whereas their front edges are linear such that both end portions extend to the same positions in the vicinity of the centers thereof, covering the cut-out regions of the connection portions 15. A portion of the rear wall 25 in which the edgewise coil 16 of the choke coil 11 is disposed is a bulge portion 25A that bulges rearwardly in an arc shape, extending along the outer circumference of the edgewise coil 16 (see FIGS. 5 and 6).

Figure 4:
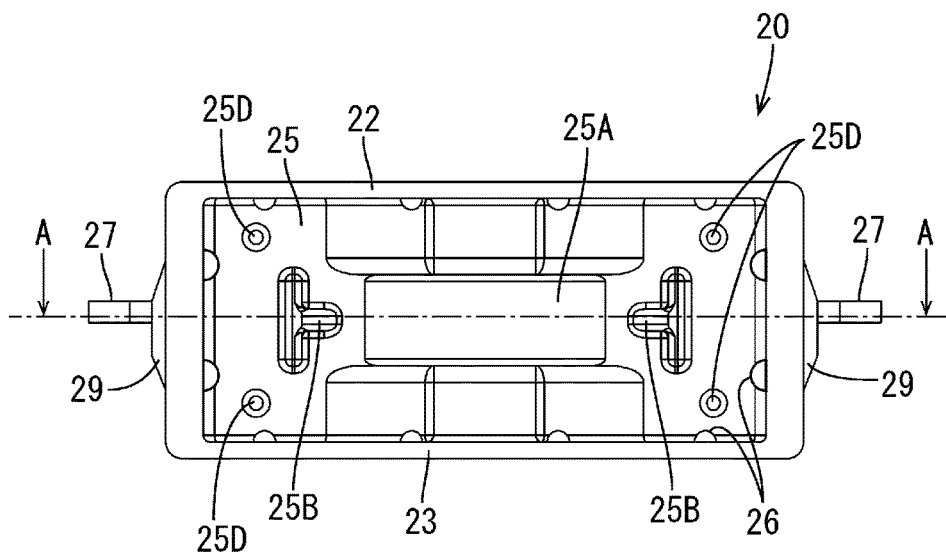
FIG. 4 is a front view of the coil case.
Figure 5:
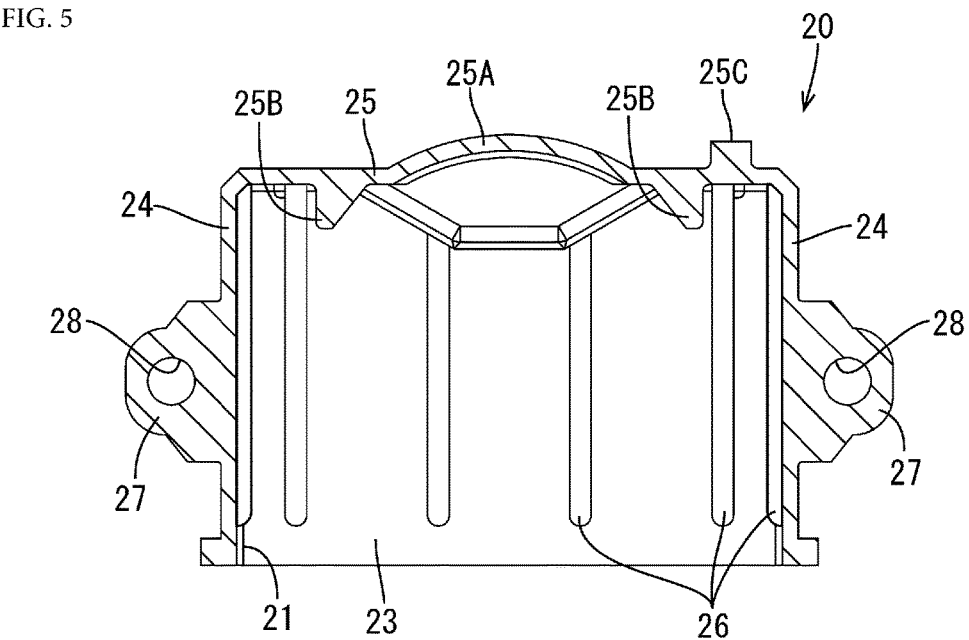
FIG. 5 is a cross-sectional view taken along A-A in FIG. 4.
Figure 6:
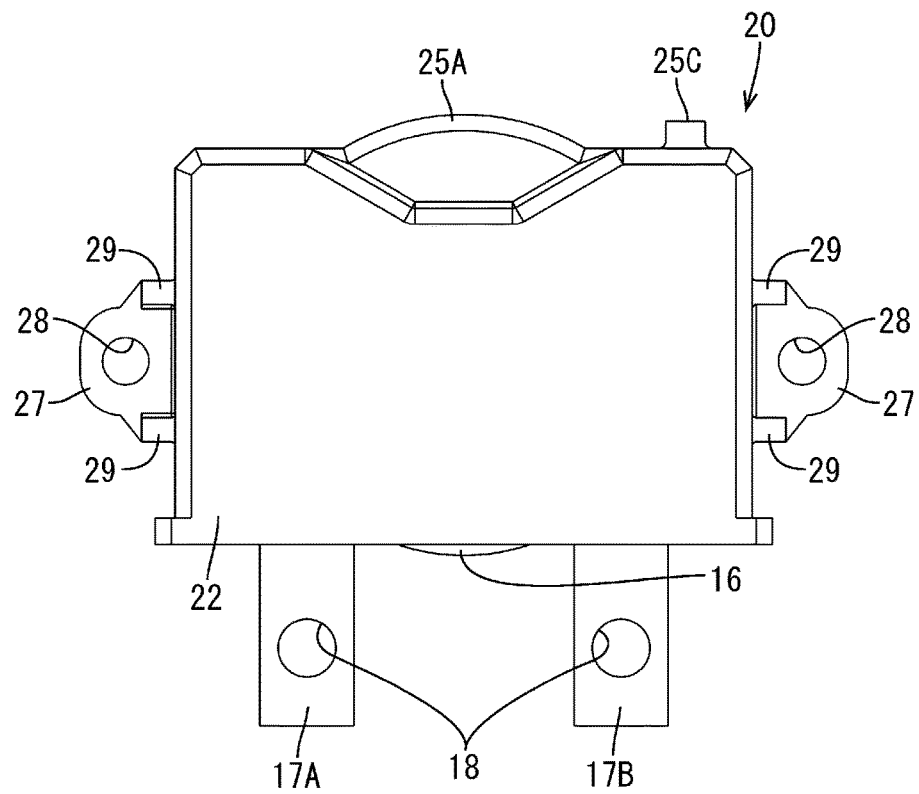
FIG. 6 is a plan view of a coil assembly.
Figure 10:
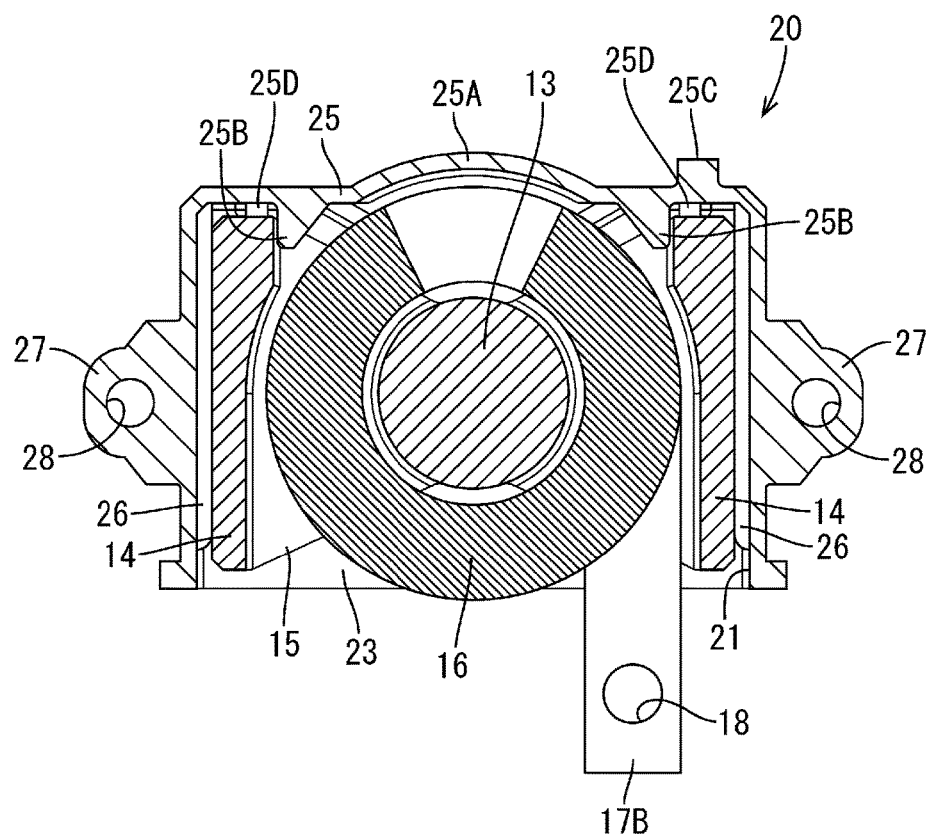
FIG. 10 is a cross-sectional view taken along B-B in FIG. 7.
Figure 11:
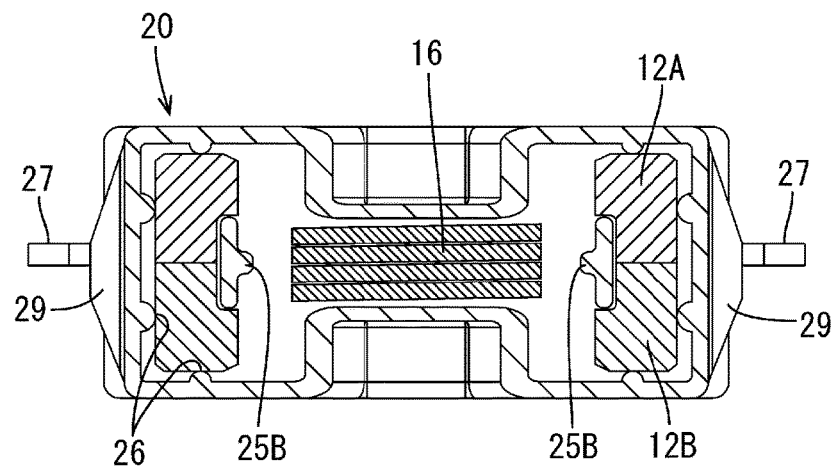
FIG. 11 is a cross-sectional view taken along C-C in FIG. 9.

Also, a pair of positioning protrusions 25B for positioning the magnetic core 12 (legs 14) and the edgewise coil 16 of the choke coil 11 that is inserted into the coil case 20 are provided on an inner surface of the rear wall 25 and protrude frontward (see FIGS. 5 and 10). Pairs of abutting ribs 25D are provided on an inner surface of the rear wall 25. As shown in FIG. 4, the pairs of abutting ribs 25D are provided outside of the pair of positioning protrusions 25B. Furthermore, a positioning rib 25C that fits in a guiding recess 46 of an outer case 30 that will be described is provided near an end portion on one side of an outer surface of the rear wall 25 (leftward in FIG. 8), extending in the vertical direction and protruding therefrom.

A plurality of abutting ribs 26 that abut against the outer surfaces (upper and lower surfaces and side surfaces) of the magnetic core 12 of the choke coil 11 are provided on inner surfaces of the upper wall 22, the bottom wall 23, and the side walls 24 of the coil case 20, extending in a direction in which the choke coil 11 is inserted (the front-rear direction) (see FIG. 2).

As shown in FIG. 2, plate-shaped fixing portions 27 are integrally provided on the pair of side walls 24 of the coil case 20. The fixing portions 27 extend orthogonally outward from the side walls 24 such that the plate surfaces thereof are parallel to the upper wall 22 and the bottom wall 23. Attaching holes 28 for attachment to fixing holes 35 of the coil rest 32 that will be described later pass through these fixing portions 27.

Also, both end portions on the base end side of the fixing portion 27 are integrally connected to a pair of reinforcement walls 29 that are provided upright on the side walls 24 and extend in the vertical direction.

This pair of fixing portions 27 can undergo slight elastic deformation with respect to the coil case 20. Specifically, their tips are bendable about the base ends that are connected to the side walls 24 of the coil case 20.

As shown in FIG. 3, the choke coil 11 is accommodated in the coil case 20 in an orientation such that the pair of connection portions 17A and 17B protrude outwardly from the opening 21. In this state, the outer surface of the magnetic core 12 is in contact with the plurality of abutting ribs 26 of the coil case 20, and a small gap is formed between the outer surface of the magnetic core 12 and the inner surface of the coil case 20 (see FIG. 7). Also, the rear surface of the magnetic core 12 is in contact with the abutting ribs 25D provided on a rear wall inner surface of the coil case 20, and a small gap is formed between the rear surface of the magnetic core 12 and the rear wall inner surface of the coil case 20 (see FIG. 10). The coil case 20 is filled with the potting material 60 in a state in which the choke coil 11 is accommodated, thus forming the coil assembly 10 (see FIGS. 12 and 13).

An epoxy resin or the like may be used as the potting material 60, for example.

This coil assembly 10 is attached inside the outer case 30.

Figure 14:
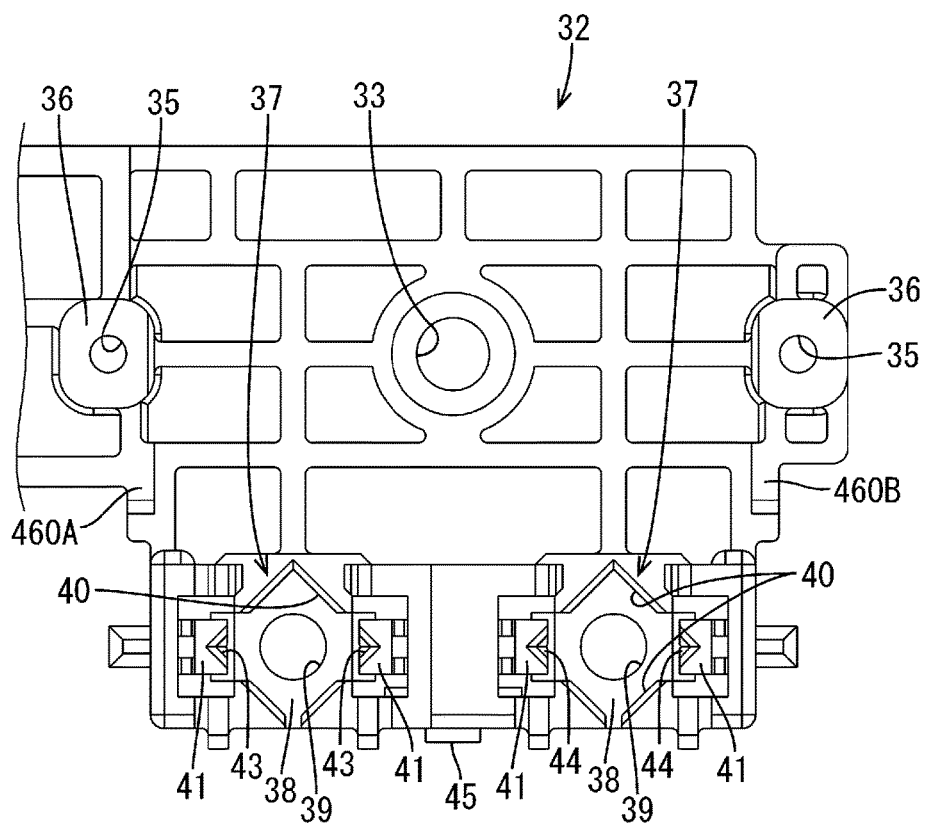
FIG. 14 is a plan view of a coil rest.
Figure 18:
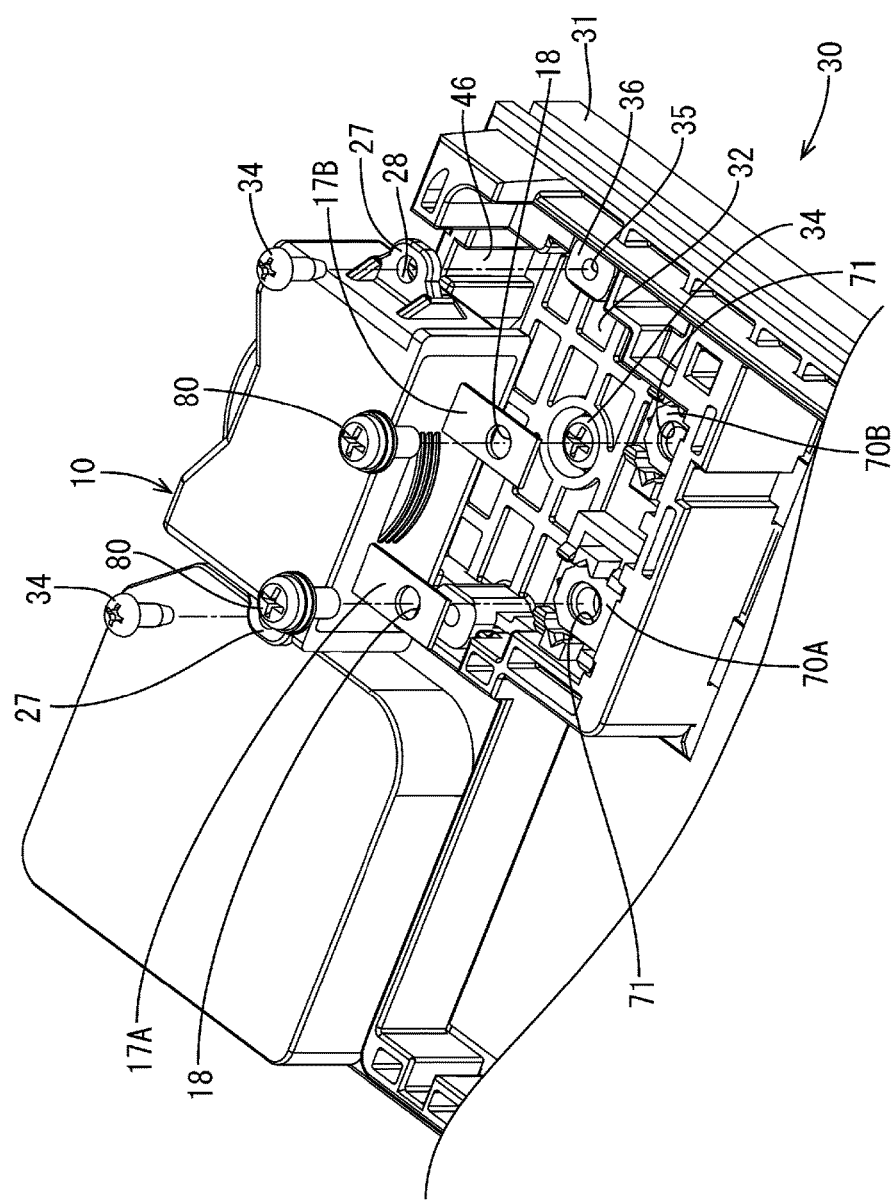
FIG. 18 is a perspective view of an electrical connection box partway through assembling.

As shown in FIG. 18, the outer case 30 includes a frame body 31 made of a synthetic resin and the coil rest (an example of a resin member) 32 that is arranged inside the frame body 31 and is made of a synthetic resin. As shown in FIG. 14, the coil rest 32 is a plate-shaped member, and is fixed to a heat dissipation plate by passing a round screw 34 through a through hole 33 provided at an approximately central portion and screwing the round screw 34 into a screw hole of the heat dissipation plate (not shown) disposed inside the frame body 31. The coil rest 32 is locked at a predetermined position inside the frame body 31 by locking a locking protrusion 45 provided on the front surface of the coil rest 32 to a receiving portion (not shown) provided on the frame body 31.

Figure 19:
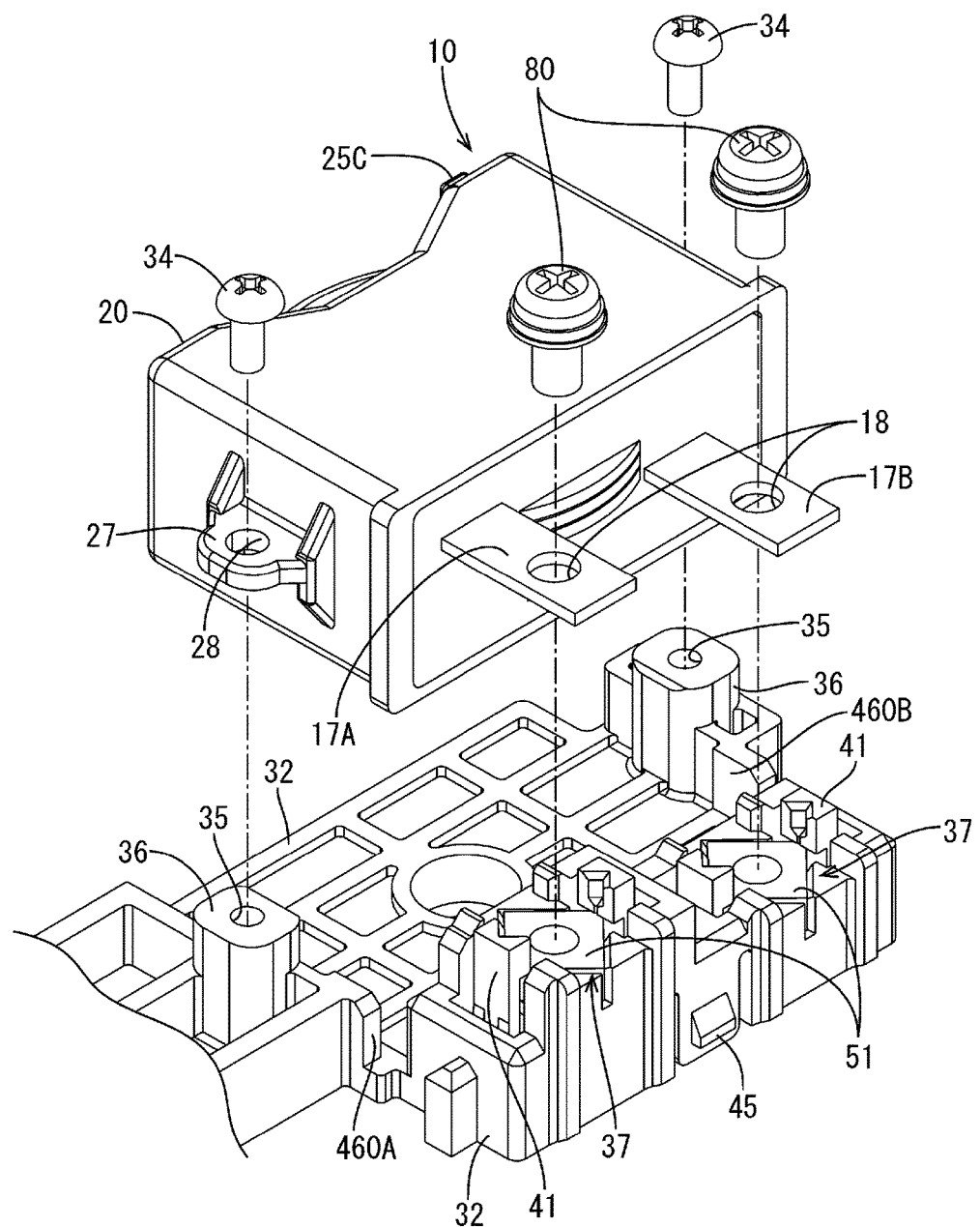
FIG. 19 is an enlarged perspective view of main portions of FIG. 18.

As shown in FIGS. 14 and 19, a pair of fixing rests 36 (an example of attachment portions) are provided on the coil rest 32. The upper surfaces of the fixing rests 36 are arranged at a position higher than that of the bottom of the coil rest 32. Fixing holes 35 are provided on the upper surfaces of the fixing rests 36. These fixing holes 35 correspond to the attaching holes 28 of the fixing portions 27 of the coil case 20.

The coil assembly 10 (the coil case 20) is fixed to the coil rest 32 (see FIGS. 19 and 20) by screwing the round screws 34 into the fixing holes 35 of the fixing rests 36, the attaching holes 28 provided in the fixing portions 27 of the coil case 20 being placed on the fixing holes 35 of the fixing rest 36. In other words, the coil case 20 is fixed to the frame body 31 (the outer case 30) via the coil rest 32.

Note that at this time, the orientation of the coil assembly 10 relative to the outer case 30 is guided by the positioning rib 25C provided on the rear wall 25 of the coil case 20 fitting in the guiding recess 46 provided on the outer case 30 (see FIG. 18).

As shown in FIG. 18, counterpart connection terminals 70A and 70B (an example of counterpart connection portions) are disposed at positions at which the connection portions 17A and 17B of the coil assembly 10 are disposed in a state in which the coil assembly 10 (the coil case 20) is fixed to the coil rest 32. The counterpart connection terminals 70A and 70B are connected to a circuit board of the outer case 30, and are installed at heights corresponding to the connection portions 17A and 17B. The connection portions 17A and 17B and the counterpart connection terminals 70A and 70B are electrically connected to each other by passing bolts 80 through the connection holes 18 and 71 that are placed on each other and fastening the bolts 80 with square nuts 51 (described later) disposed on the lower surfaces of the counterpart connection terminals 70A and 70B. Note that the counterpart connection terminals 70A and 70B are omitted in FIGS. 19 and 20.

Figure 16:
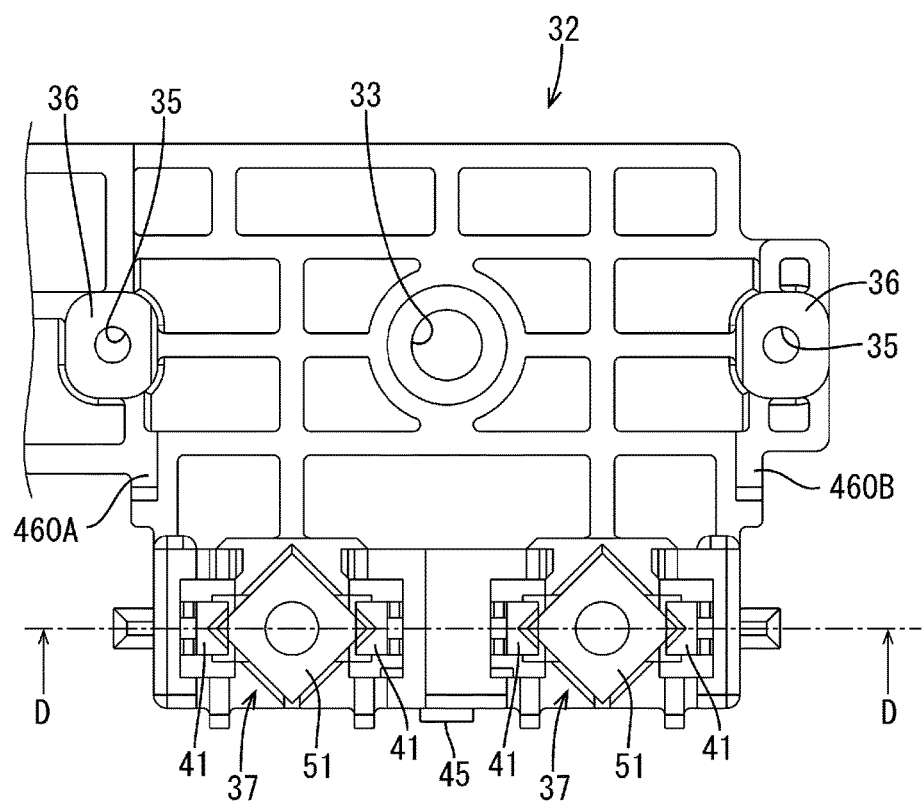
FIG. 16 is a plan view of a coil rest in a state in which the square nut is installed.

The above-described square nuts 51 are held by nut holding portions 37 provided on the coil rest 32. In the present embodiment, as shown in FIGS. 16 and 19, the square nuts 51 having a square shape are held in a state in which the square nuts 51 are inclined with respect to the nut holding portions 37. Specifically, as shown in FIG. 16, the nuts are held in a state in which the outlines of the nuts are inclined at an angle of 45 degrees relative to the direction in which the connection portions 17A and 17B extend (the vertical direction in FIGS. 16 and 27). The square nuts 51 are configured such that a pair of corners that are diagonally opposite to each other (corners on the left and right sides in FIG. 16) are prevented from disconnecting from the nut holding portions 37.

Incidentally, the square nuts 51 have a structure in which the nuts are held by the nut holding portions 37 by preventing disconnection of a portion of the outer shape. Therefore, it is necessary to set the size of the square nuts 51 such that a portion of the outer shape protrudes outwardly from the connection portions 17A and 17B. Thus, if the square nuts 51 are arranged without inclination if the nuts are arranged such that the outer shape of nuts extends in the direction in which the connection portions 17A and 17B extend), the width of one side of the square nut 51 needs to be larger than the width of the connection portions 17A and 17B.

On the other hand, the length of the diagonal line of the square nut 51 is longer than the length of one side. Therefore, as in the present embodiment, if the square nuts 51 are inclined, the corners of the square nuts 51 protrude from the connection portions 17A and 17B due to the width of the square nuts 51 being set approximately equal to the width of the connection portions 17A and 17B of the edgewise coil 16. The square nuts 51 can thus be held by preventing disconnection of the protruding corners. That is, compared to the case where the square nuts 51 are arranged without inclination, square nuts 51 having a smaller width can be adopted, resulting in a reduction of the weight of the entire coil assembly 10.

Figure 17:
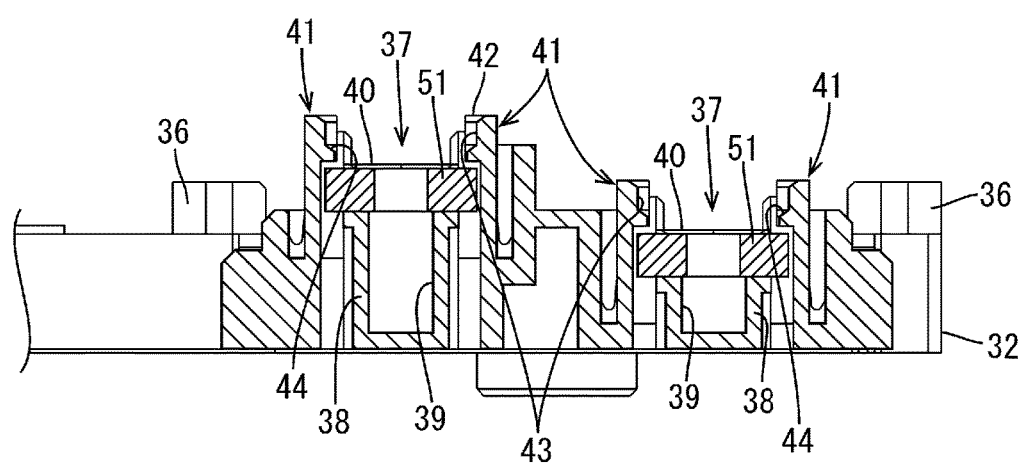
FIG. 17 is a cross-sectional view taken along D-D in FIG. 16.

Describing the nut holding portions 37 in more detail, as shown in FIG. 17, the nut holding portions 37 include a pair of supports 38 that rise from the bottom of the coil rest 32 in the vertical direction and support the square nuts 51 on their upper surface. The central portions of the supports 38 are recessed downward from their upper surface, and are escape portions 39 for allowing the escape of the tips of the bolts 80 that pass through the square nuts 51.

Note that the two supports 38 are set to have different heights from the bottom of the coil rest 32, in correspondence with the pair of connection portions 17A and 17B of the coil assembly 10.

Figure 15:
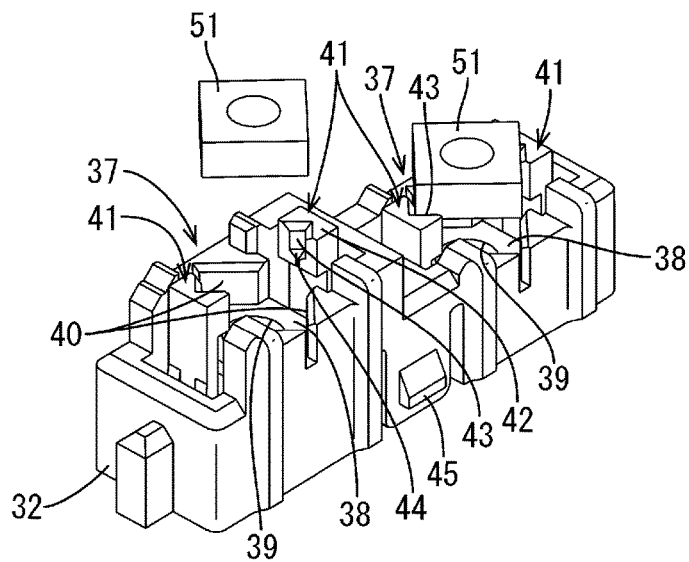
FIG. 15 is an enlarged perspective view of a square nut and main portions of a coil rest (nut holding portion).

As shown in FIGS. 14 and 15, holding walls 40 for holding the square nuts 51 on the upper surfaces of the supports 38 in the proper orientation are provided at the periphery of the upper surfaces of the supports 38. The holding walls 40 are set such that their inner surfaces are inclined at an angle of 45 degrees relative to the direction in which the connection portions 17A and 17B of the assembled coil assembly 10 extend, along the side surface of the square nut 51. Also, the upper surface of the holding walls 40 is set to have a substantially equal height as the square nuts 51 when the square nuts 51 are placed on the supports 38 (see FIGS. 17 and 19).

When the square nuts 51 are placed on the supports 38, two pairs of elastic locking pieces 41 for vertically locking the corners of the square nuts 51 and preventing disconnection are provided at positions that correspond to a pair of corners of the four corners of the square nut 51, the pair of corners being disposed in the left-right direction (direction intersecting the direction in which the connection portions 17A and 17B of the assembled coil assembly 10 extend) and opposite to each other.

The elastic locking pieces 41 are plate-shaped members, and as shown in FIG. 17, the elastic locking pieces 41 are provided at a distance from the supports 38. Thus, the elastic locking pieces 41 can undergo elastic deformation toward the side away from the supports 38 (outward) due to space for bending on the side away from the supports 38.

As shown in FIGS. 15 and 17, upper end portions of these elastic locking pieces 41 serve as protrusion portions 42 that protrude toward the supports 38, and prevention of disconnection toward the upper side is achieved by locking a pair of corners of the square nut 51 with a lower surface of this protrusion portion 42.

Also, guiding grooves 43 for guiding a pair of corners of the square nut 51 downward from the upper surface are formed up to the vicinity of the lower end of the protrusion portion 42, the guiding grooves 43 extending along the corner of the square nut 51. The lower portion of the guiding grooves 43 have an inclined surface 44 that is inclined toward the support 38 (inward), and accordingly, when the square nut 51 reaches and is then pushed into the lower end of the guiding groove 43, the square nut 51 can overcome the protrusion portion 42 due to outward elastic deformation of the elastic locking piece 41 by the inclined surface 44 and reach the support 38.

Next, a method for manufacturing the coil assembly 10 and a method for attaching the coil assembly 10 will be described.

In order to manufacture the coil assembly 10, first, the choke coil 11 is inserted into the coil case 20 with an orientation in which the connection portions 17A and 17B of the choke coil 11 protrude from the opening 21 (see FIGS. 2 and 3). An outer surface of the choke coil 11 is inserted while abutting against the abutting ribs 26 provided in the inside of the coil case 20 and is positioned by the positioning protrusions 25B (see FIG. 10).

Figure 7:
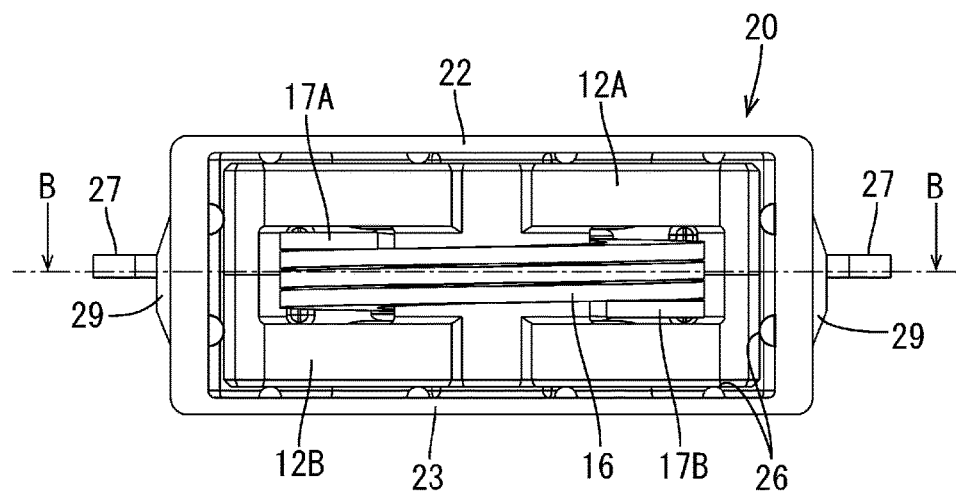
FIG. 7 is a front view of a state in which the coil case accommodates the choke coil.
Figure 8:
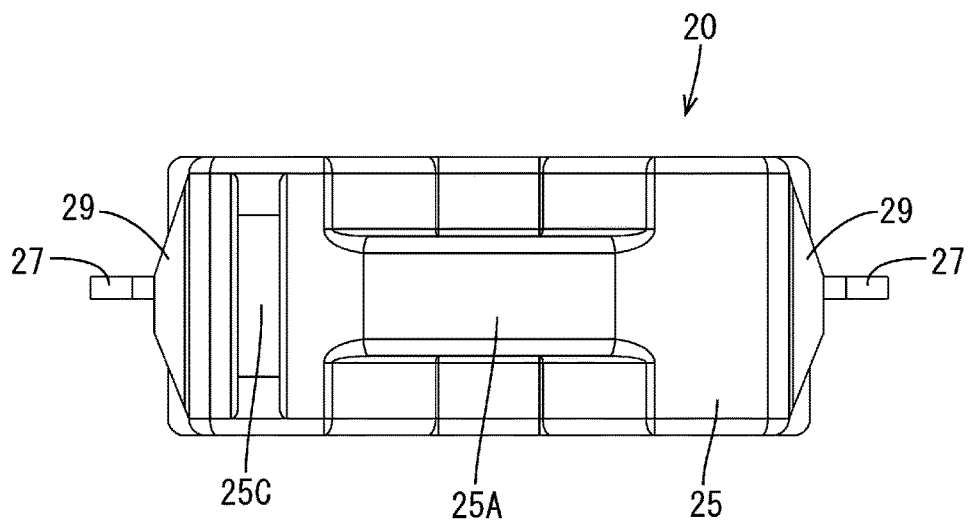
FIG. 8 is a rear view of the coil assembly.
Figure 9:
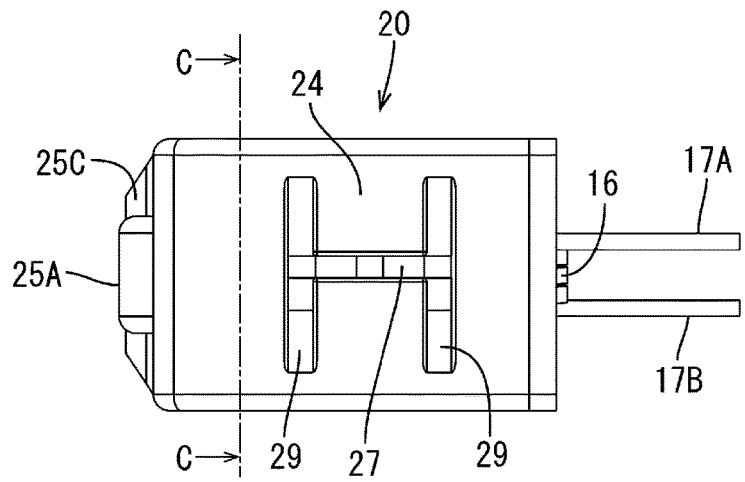
FIG. 9 is a side view of a state in which the coil case accommodates the choke coil.

In this state, a small gap is formed by the abutting ribs 26 between the outer surface of the magnetic core 12 and the inner surface of the coil case 20 (see FIG. 7). Also, a small gap is formed by the abutting ribs 25D between a rear surface of the magnetic core 12 and an inner surface of the rear wall of the coil case 20 (see FIG. 10).

In this manner, when the choke coil 11 is inserted at a regular position of the coil case 20, the coil case 20 is arranged such that the opening 21 of the coil case 20 is directed upward, and the coil case 20 is filled with the potting material 60 through the opening 21. The gap between the choke coil 11 and the coil case 20 and the gap between the edgewise coil 16 and the magnetic core 12 is filled with the potting material 60, and the potting material 60 gradually solidifies. Accordingly, the coil assembly 10 in which the choke coil 11 is fixed into the coil case 20 is completed (see FIGS. 12 and 13).

Next, the square nuts 51 for connecting the connection portions 17A and 17B of the coil assembly 10 and the counterpart connection terminal 70A and 70B are attached to the coil rest 32.

First, as shown in FIG. 15, the square nuts 51 are brought near the nut holding portions 37 of the coil rest 32, and a pair of corners that are opposite to each other are fitted in the guiding grooves 43 of the elastic locking pieces 41, and the square nuts 51 are pushed downward. The entire elastic locking pieces 41 undergo outward elastic deformation due to the inclined surfaces 44 of the lower end of the guiding grooves 43 being pushed against the corners of the square nut 51, and accordingly, the square nuts 51 overcome the protrusion portions 42 and reach the supports 38. When the square nuts 51 are placed on the supports 38, the elastic locking pieces 41 undergo elastic return, preventing disconnection of the pair of corners that are opposite to each other of the square nut 51 by the lower surface of the protrusion portion 42.

Next, the coil rest 32 on which the square nuts 51 are installed is fitted from below in FIG. 18 at a predetermined position inside the frame body 31 of the outer case 30. At this time, the coil rest 32 is locked at a predetermined position inside the frame body 31 by the locking protrusion 45 provided on the coil rest 32 being locked to a receiving portion (not shown) provided on the frame body 31.

Subsequently, a heat dissipation plate (not shown) is disposed on the lower surface of the coil rest 32, and the coil rest 32 and the heat dissipation plate are fixed to each other by passing the round screw 34 through the through hole 33 and screwing the round screw 34 into a screw hole (not shown) of the heat dissipation plate.

In this state, as shown in FIG. 18, the connection terminals 70A and 70B for a circuit board that is pre-installed inside the outer case 30 are arranged above the pair of square nuts 51.

Next, the coil assembly 10 is arranged right above of the coil rest 32, the connection portions 17A and 17B are placed on the counterpart connection terminals 70A and 70B, and the fixing portions 27 are placed on the fixing rests 36. At this time, since the positioning ribs 25C of the coil case 20 are fitted in the guiding recess 46 of the outer case 30, the coil assembly 10 is disposed at a regular position with a stable orientation.

Figure 20:
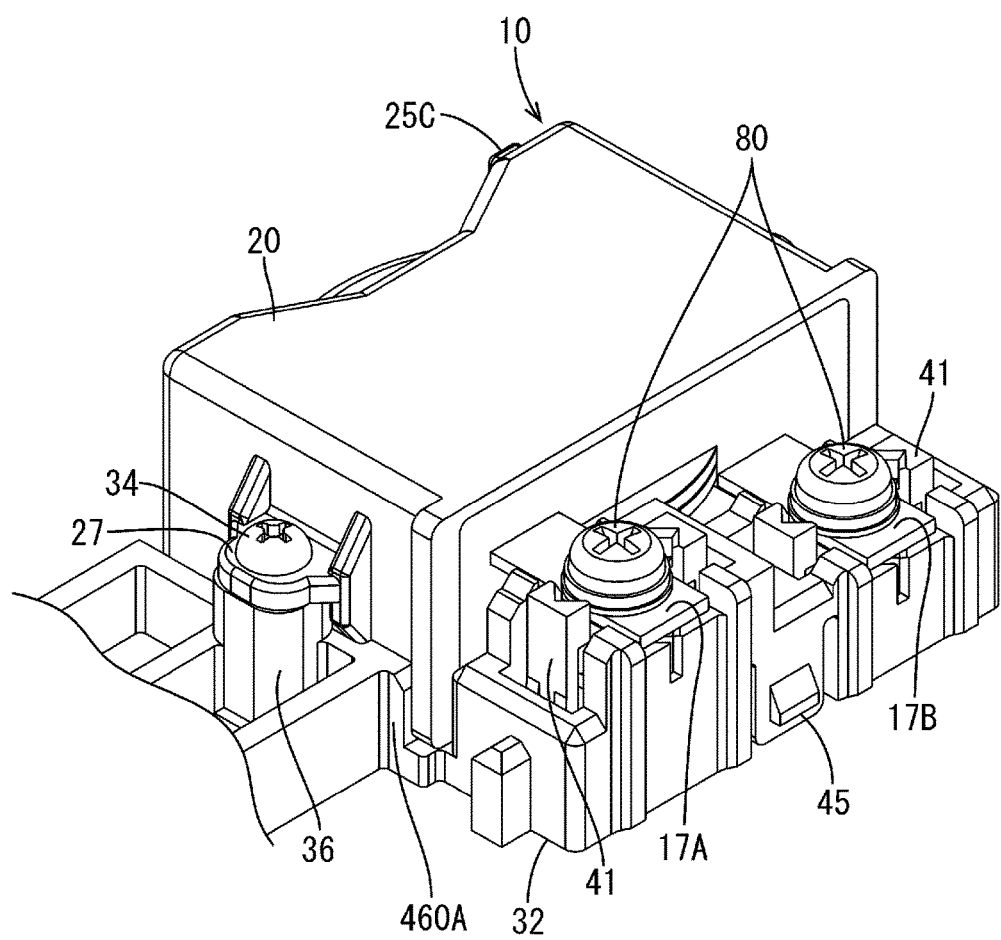
FIG. 20 is an enlarged perspective view of main portions of the electrical connection box to which the coil assembly is attached.

The coil assembly 10 is connected to the counterpart connection terminals 70A and 70B and is attached to the outer case 30 by fitting the bolts 80 in the connection holes 18 of the connection portions 17A and 17B that are placed thereon and the connection holes 71 of the counterpart connection terminals 70A and 70B and screwing the bolts 80 in the screw holes of the square nuts 51, and fitting the round screws 34 in the attaching holes 28 of the fixing portions 27 and screwing them in the fixing holes 35 (see FIGS. 19 and 20).

Figure 21:
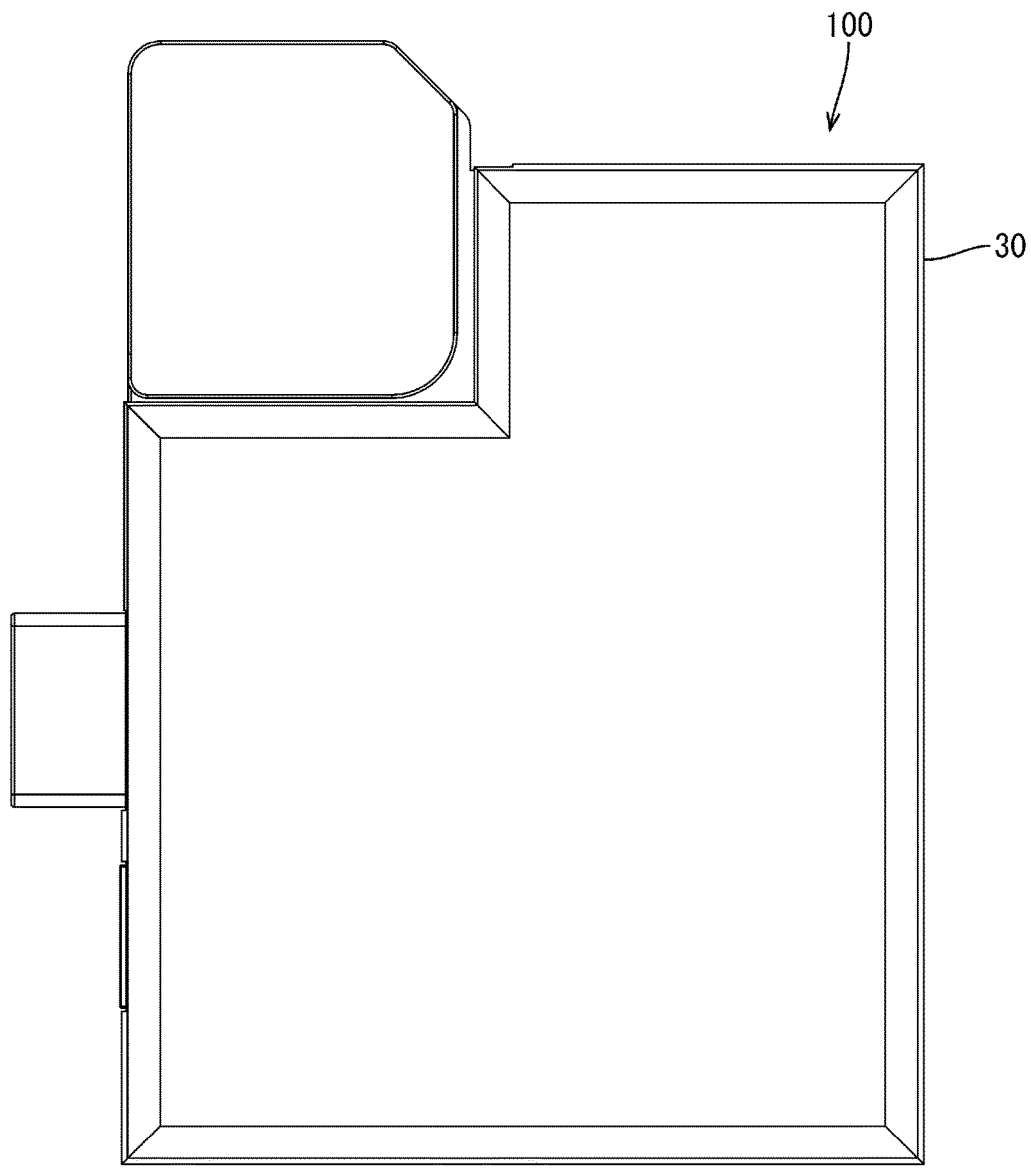
FIG. 21 is a plan view of the electrical connection box.
Figure 22:
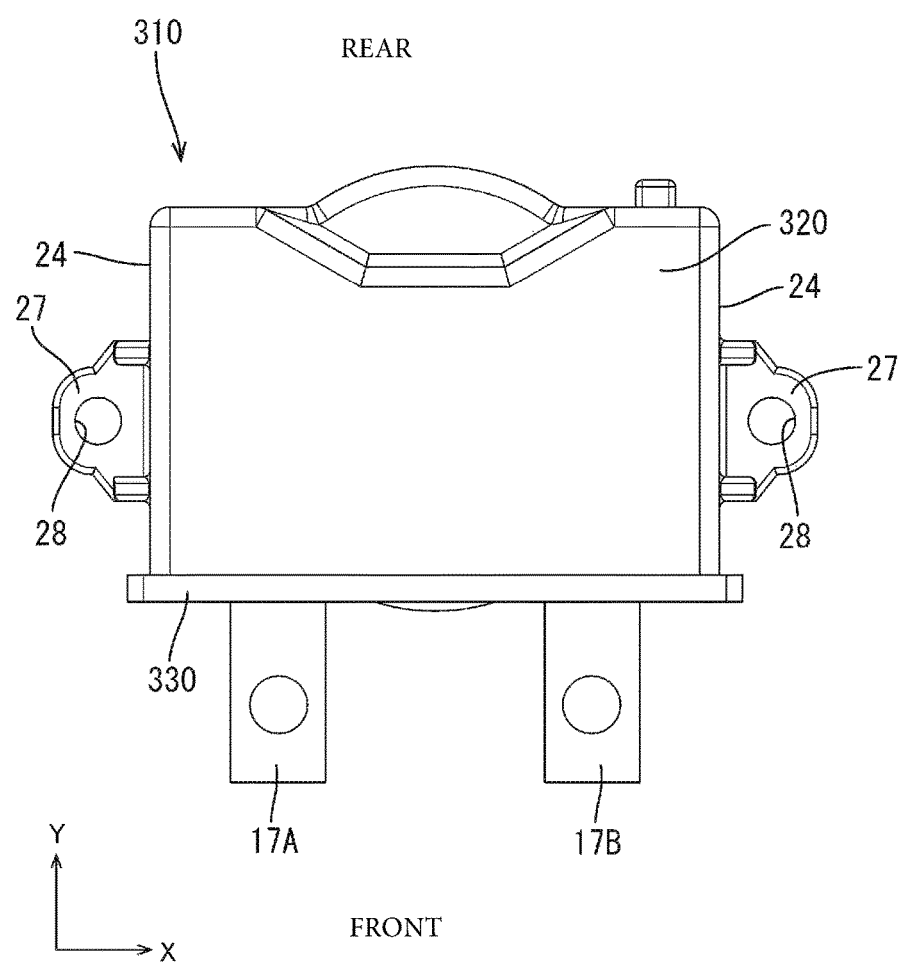
FIG. 22 is a plan view of a coil assembly of Embodiment 2.

Moreover, an electrical connection box 100 is completed by covering the entire frame body 31 with a cover (see FIG. 21). Note that the electrical connection box 100 includes the circuit board, the heat dissipation plate, the coil assembly 10, the outer case 30, the cover, and the like.

According to such a coil assembly 10 of the present embodiment, the following effects are obtained. In general, if a component is to be fixed forcibly, the component warps due to a dimensional error of the component and an excessive force is applied to the component. The coil assembly 10 has a configuration in which the choke coil 11 is fixed to the coil rest 32 of the outer case 30 via the coil case 20. Therefore, warping resulting from a dimensional error of a component and an error in an assembling position can be absorbed between the coil case 20 and the choke coil 11. Therefore, compared to the case where the choke coil 11 is directly fixed to the coil rest 32, it is possible to prevent a strong force from being applied to the choke coil 11 and the magnetic core 12 of the choke coil 11 is unlikely to crack. In addition, the fixing portion 27 of the coil case 20 has elasticity and thus can absorb warping. Therefore, the magnetic core 12 is less likely to crack.

Also, since the inside of the coil case 20 is filled with the potting material 60 and has a configuration in which no air is present, abnormal noises resulting from magnetostriction can be suppressed. Moreover, the choke coil 11 does not rattle inside the coil case 20. Therefore, it is possible to assemble the coil assembly 10 that is unlikely to generate abnormal noises.

Also, since the abutting ribs 26 and 25D are provided on the inner surface of the coil case 20 and a small gap is formed between the outer surface of the choke coil 11 and the inner surface of the coil case 20, it is possible to reliably fill this gap with the potting material 60, accordingly further suppressing the generation of abnormal noises, and more strongly fixing the choke coil 11 into the coil case 20.

The square nuts 51 are attached to the coil rest 32 (the outer case 30) at an angle of 45 degrees relative to the direction in which the connection portions 17A and 17B of the coil assembly 10 extend in the attached state, on the plane same as that direction. Such a configuration makes it possible to adopt square nuts 51 having a width that is smaller than in a configuration in which the square nuts 51 are attached in a direction parallel to the direction in which the connection portions 17A and 17B extend. That is, the weight of the coil assembly 10 can be reduced.

Embodiment 2 will be described with reference to FIGS. 16, and 22 to 31. Note that in the following description, a direction in which the connection portions 17A and 17B are lined up (the left-right direction in FIGS. 22 and 27) is denoted as the X-direction and a direction in which the choke coil 11 is inserted into a coil case 320 (the vertical direction in FIGS. 22 and 27) is denoted as the Y-direction.

A coil assembly 310 of Embodiment 2 includes the coil case 320, the choke coil 11, and the potting material 60 filled into the coil case 320. The choke coil 11 has the same configuration as that of Embodiment 1, includes the magnetic core 12 and the edgewise coil 16, and is accommodated in the coil case 320.

Similarly to the coil case 20 of Embodiment 1, the coil case 320 is made of a synthetic resin, and has an open box shape with an opening 321 on one side (the front side). The outer surface of the coil case 320 has a flange (an example of a positioning portion) 330. The flange 330 protrudes outward from the outer surface of the coil case 20. The flange 330 is provided at an opening end portion of the coil case 320, that is, a front end portion at which the opening 321 is provided. The flange 330 is formed over the entire circumference of the coil case 320.

Figure 23:
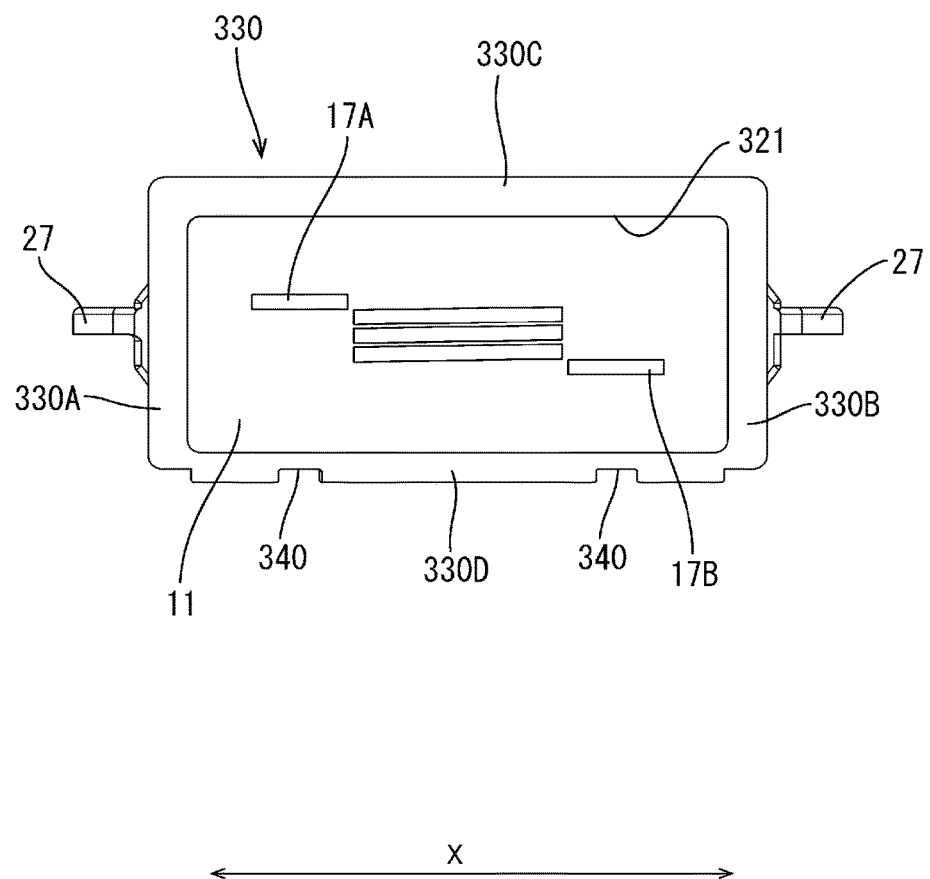
FIG. 23 is a front view of the coil assembly.

Specifically, side flanges 330A and 330B are formed at the front end portions of the side walls 24 on both sides in the X-direction of the coil case 320, an upper flange 330C is formed at a front end portion of the upper wall 22 of the coil case 320, and a bottom flange 330D is formed at a front end portion of the bottom wall 23 of the coil case 320 (see FIG. 23). Providing the flange 330 at the front end portion (the opening end portion) of the coil case 320 makes it possible to suppress warping and deformation of the coil case 320 resulting from molding. Also, in particular, the formation of the flange 330 on the entire circumference makes it possible to increase the effect of suppressing warping and deformation.

The coil assembly 310 of Embodiment 2 positions the coil case 320 using the flange 330 with respect to the coil rest 32 of the outer case 30. Specifically, two directions, namely, the X-direction (the left-right direction) and the Y-direction (the front-rear direction), are positioned. Note that the outer case 30 has the same structure as that of Embodiment 1.

Structure for Positioning in X-Direction

Figure 24:
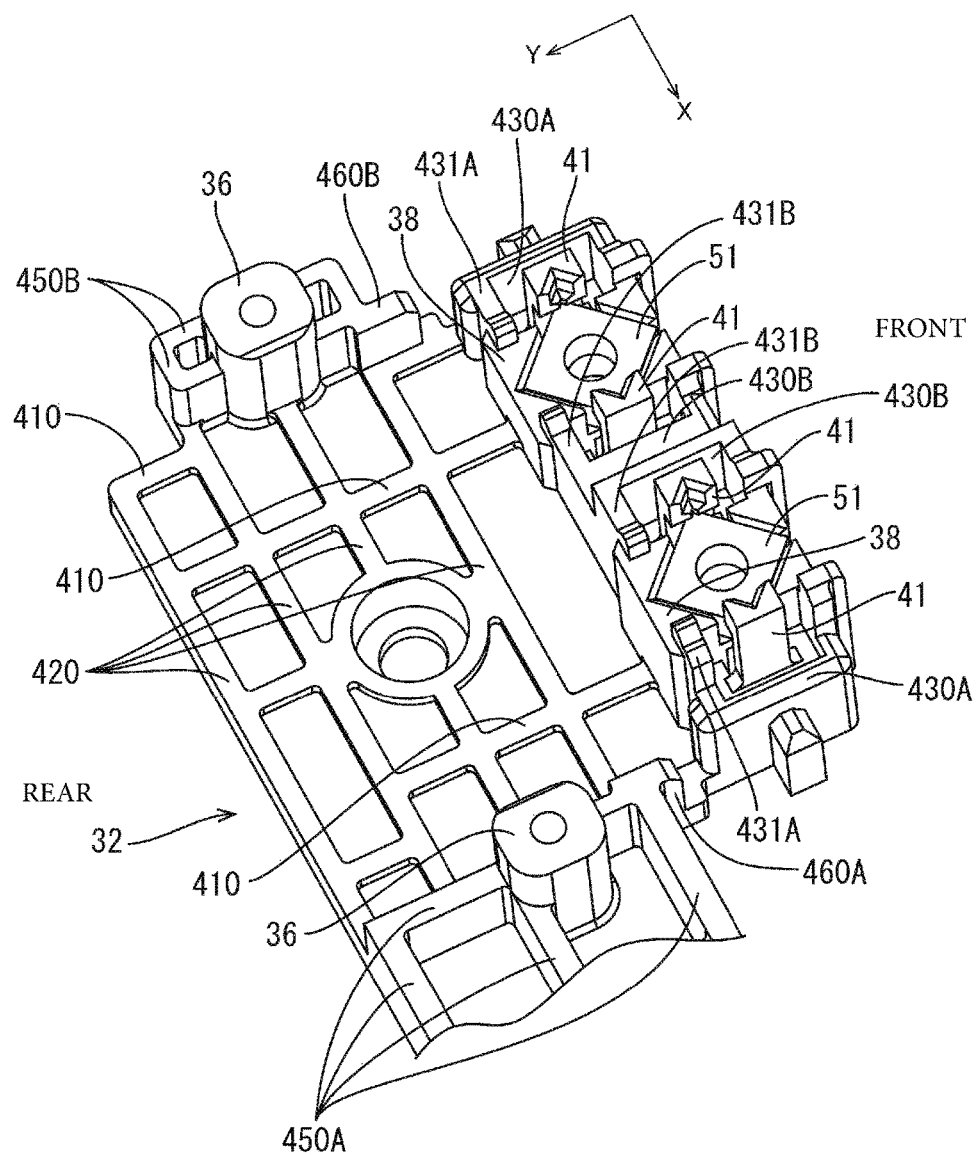
FIG. 24 is an enlarged perspective view of a portion of the coil rest.

As shown in FIG. 24, a plurality of front-rear ribs 410 and a plurality of left-right ribs 420 are formed on the coil rest 32. The front-rear ribs 410 are formed in the Y-direction and the left-right ribs 420 are formed in the X-direction. On the other hand, as shown in FIG. 23, notches 340 (an example of the recess) are provided at two locations, that is, at the left and the right, of the bottom flange 330D of the coil case 320. The notches 340 are provided at positions that correspond to the positions of two middle front-rear ribs 410 that are formed on the coil rest 32.

Figure 31:
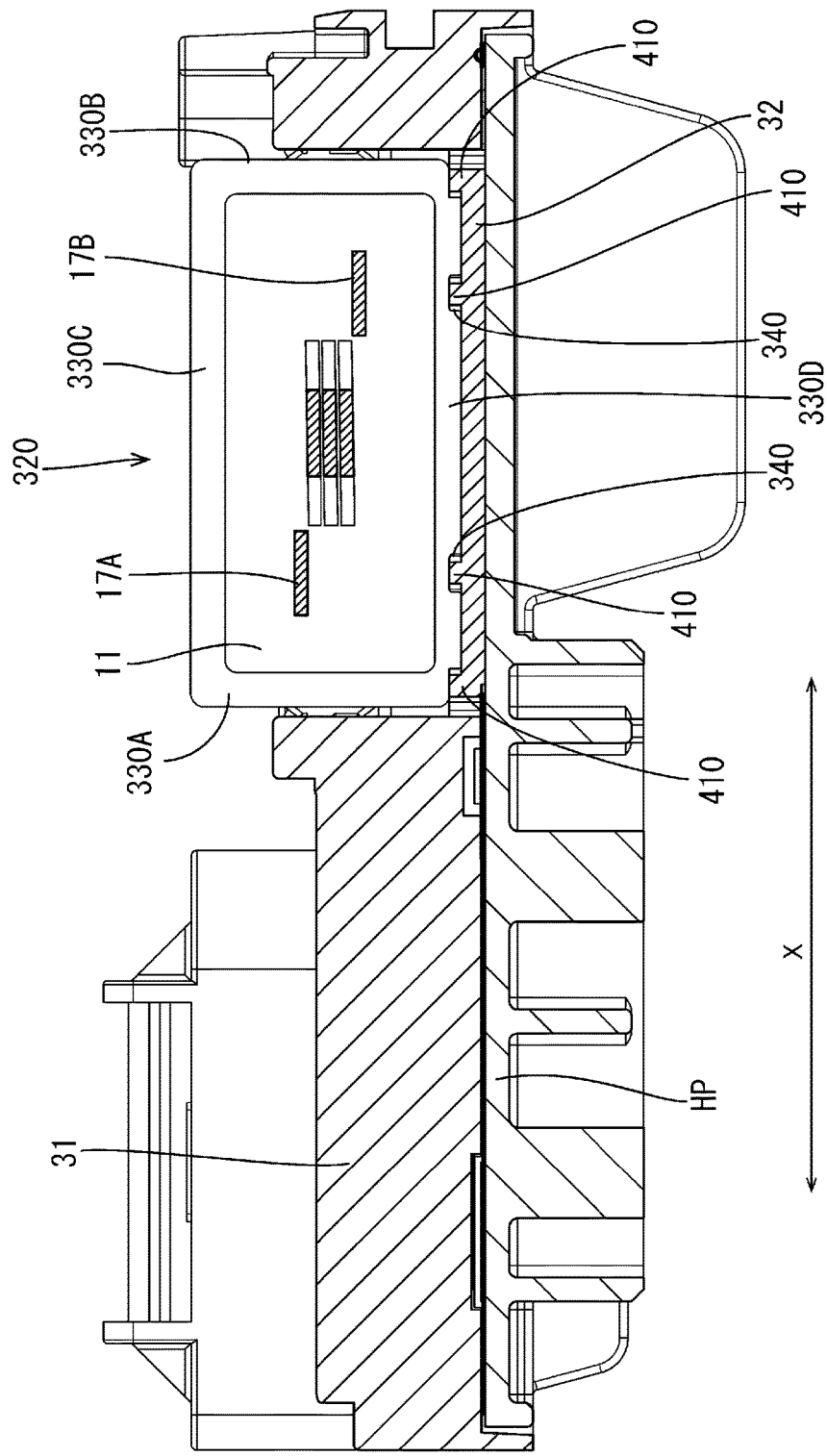
FIG. 31 is a cross-sectional view taken along line H-H of FIG. 27.

As shown in FIG. 31, the position in the X-direction (the left-right direction) of the coil case 320 is restricted by the notches 340 of the bottom flange 330D fitting in the two middle front-rear ribs 410 formed on the bottom of the coil rest 32, and the coil case 320 is positioned with respect to the coil rest 32. Specifically, the coil case 320 is positioned such that the center in the X-direction matches a center Lo (see FIG. 26) in the X-direction of the coil rest 32. Note that a reference sign "HP" shown in FIG. 31 indicates the heat dissipation plate.

Also, the coil assembly 310 has a structure for positioning the choke coil 11 in the X-direction, with a method that differs from the method for the coil case 320. Describing this more specifically, as shown in FIG. 24, the coil rest 32 has outer walls 430A and 430B on both sides in the X-direction of each of the supports 38. The outer walls 430A and 430B surround the outer sides of the elastic locking piece 41 formed on both sides in the X-direction of the support 38, and have a function of protecting the elastic locking piece 41.

Arms 431A and 431B are formed at rear ends of the outer wall 430A and 430B. Each of the arms 431A and 431B extends toward the center of the support 38. As shown in FIG. 24, tips of these two arms 431A and 431B are positioned on the upper surface of the support 38. The two arms 431A and 431B have an equal distance from the center of the support 38, and the distance between the arms matches the width of the connection portions 17A and 17B of the choke coil 11.

Figure 27:
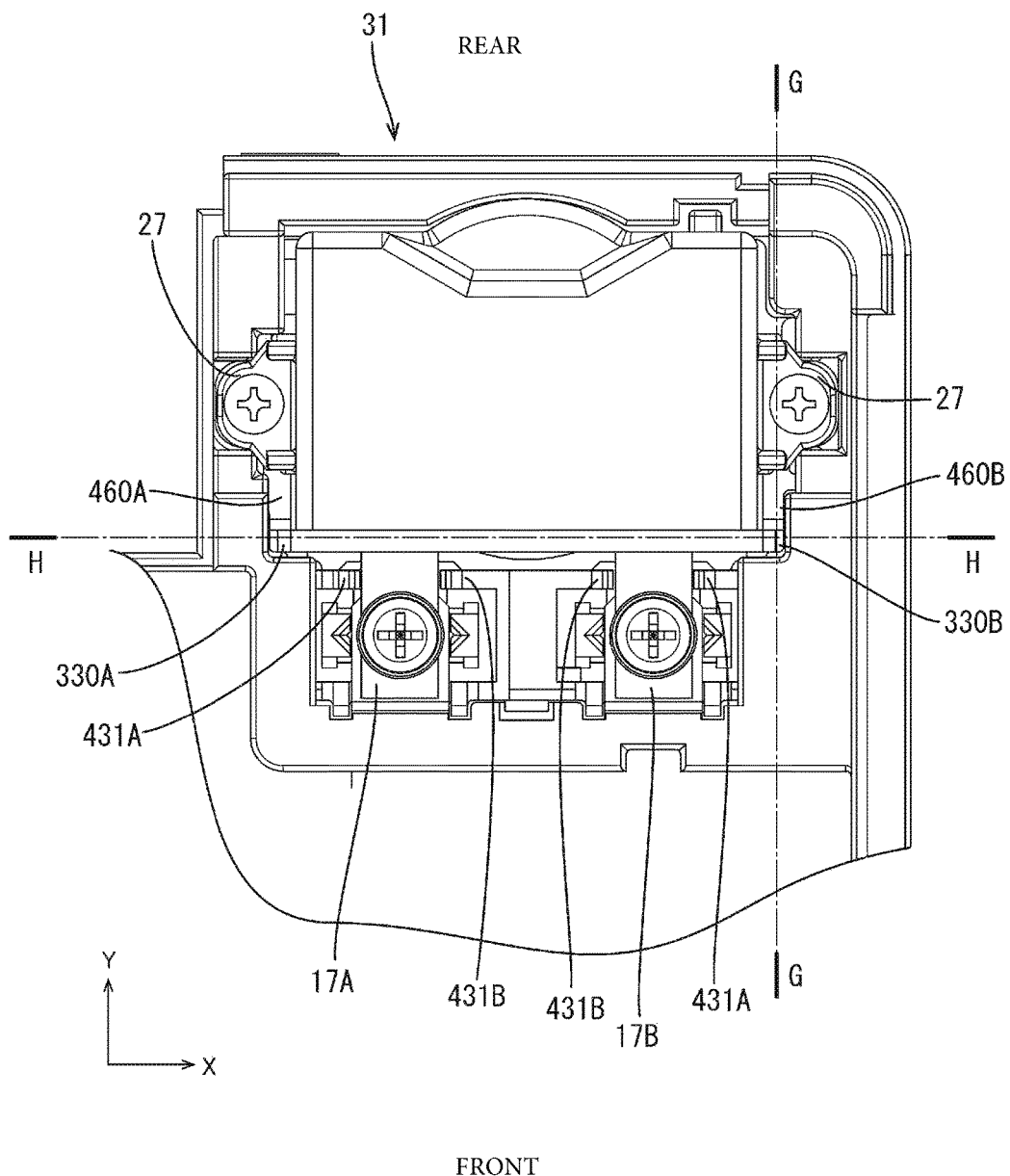
FIG. 27 is an enlarged plan view of a portion of the outer case (a state in which the coil assembly is attached is indicated).

As shown in FIG. 27, the position in the X-direction (the left-right direction) of the choke coil 11 is restricted by the connection portions 17A and 17B of the choke coil 11 fitting between the two arms 431A and 431B of each of the supports 38, and the choke coil 11 is positioned with respect to the coil rest 32. Providing a positioning structure dedicated for the choke coil separately from the positioning structure for the coil case 320 suppresses shifting of the center position of the choke coil 11 from the center Lo of the coil rest 32 even in the case where the position at which the choke coil 11 is attached to the coil case 320 shifts (for example, even if the attachment position shifts when the coil case 320 is filled with the potting material 60).

Structure for Positioning in Y-Direction

Next, a structure for positioning the coil case 320 in the Y-direction (the front-rear direction) with respect to the coil rest 32 will be described. As shown in FIGS. 16 and 24, the coil rest 32 has a pair of supporting portions 450A and 450B and a pair of longitudinal walls 460A and 460B. The pair of supporting portions 450A and 450B are provided on both sides in the X-direction of the coil rest 32 in correspondence with the fixing rests 36 on both sides in the X-direction.

Figure 25:
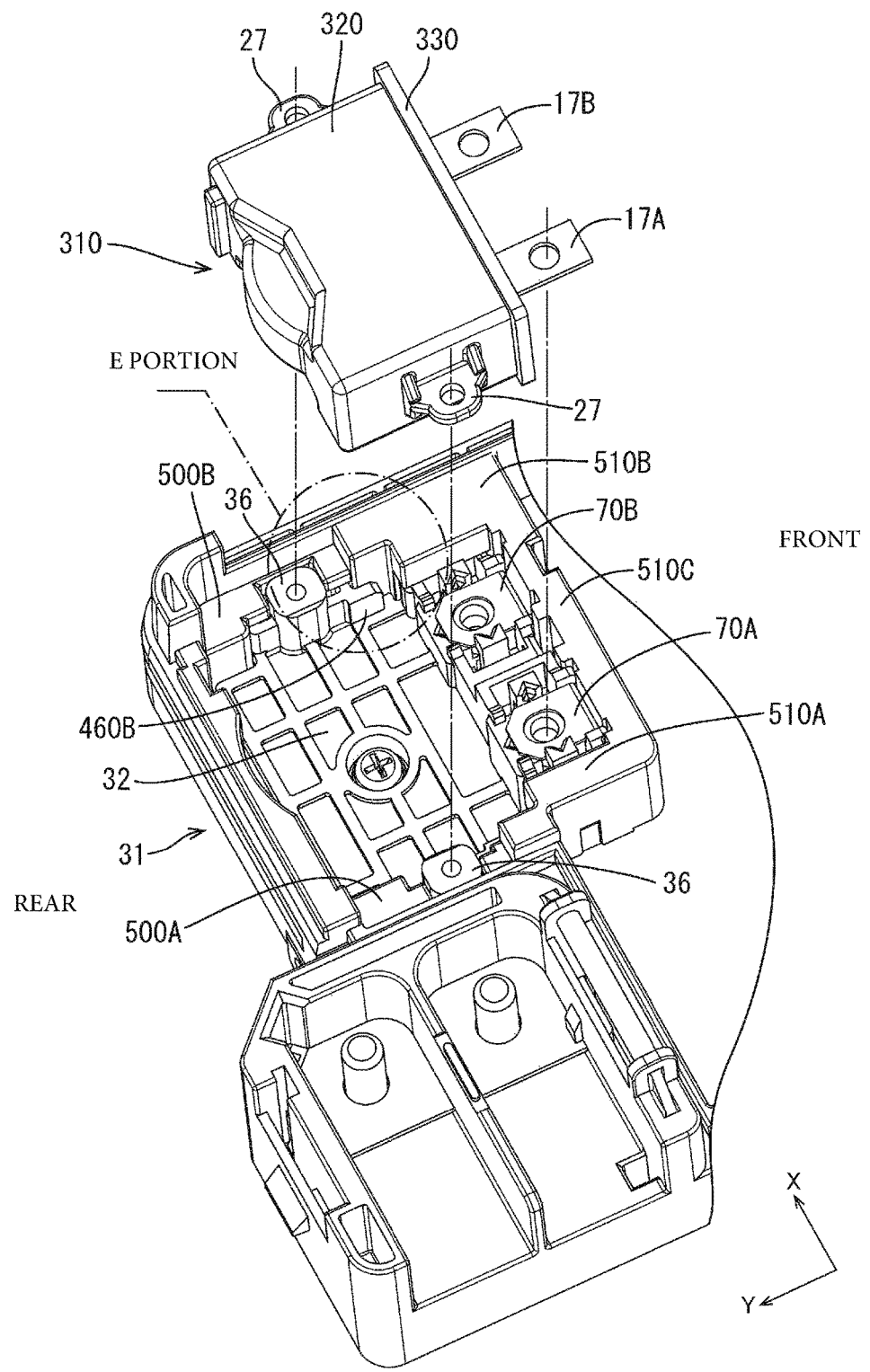
FIG. 25 is an exploded perspective view of an outer case and the coil assembly.

The heights of the supporting portions 450A and 450B are lower than the fixing rests 36, and are located outside the fixing rests 36 so as to avoid an assembling space for the coil assembly 310. As shown in FIG. 25, the supporting portions 450A and 450B support first walls 500A and 500B of the frame body 31 that surround the outer sides of the fixing rest 36.

As shown in FIG. 24, the longitudinal walls 460A and 460B are provided at inner front ends of the supporting portions 450A and 450B. The longitudinal walls 460A and 460B protrude frontward from the supporting portions 450A and 450B. The front surfaces of the longitudinal walls 460A and 460B are vertical and their upper portions are provided with tapers.

As shown in FIG. 25, the frame body 31 has second walls 510A and 510B and a third wall 510C. The second walls 510A and 510B cover the upper surfaces of the outer wall 430A and 430A formed on the coil rest 32 on both sides in the X-direction. The third wall 510C connects two second walls 510A and 510B and covers the peripheries of two supporting stands 38 lined up in the X-direction.

Figure 26:
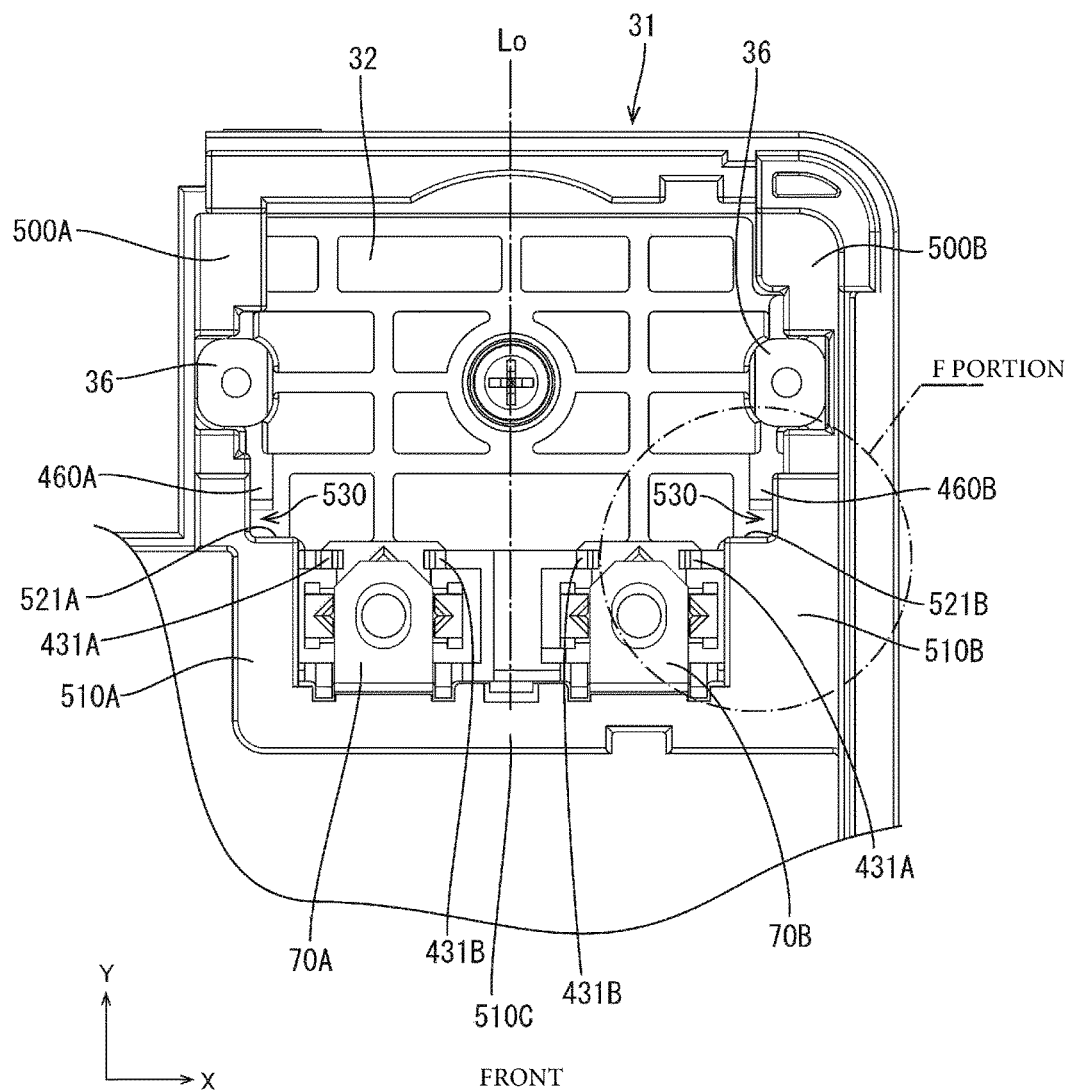
FIG. 26 is an enlarged plan view of a portion of the outer case.
Figure 28:
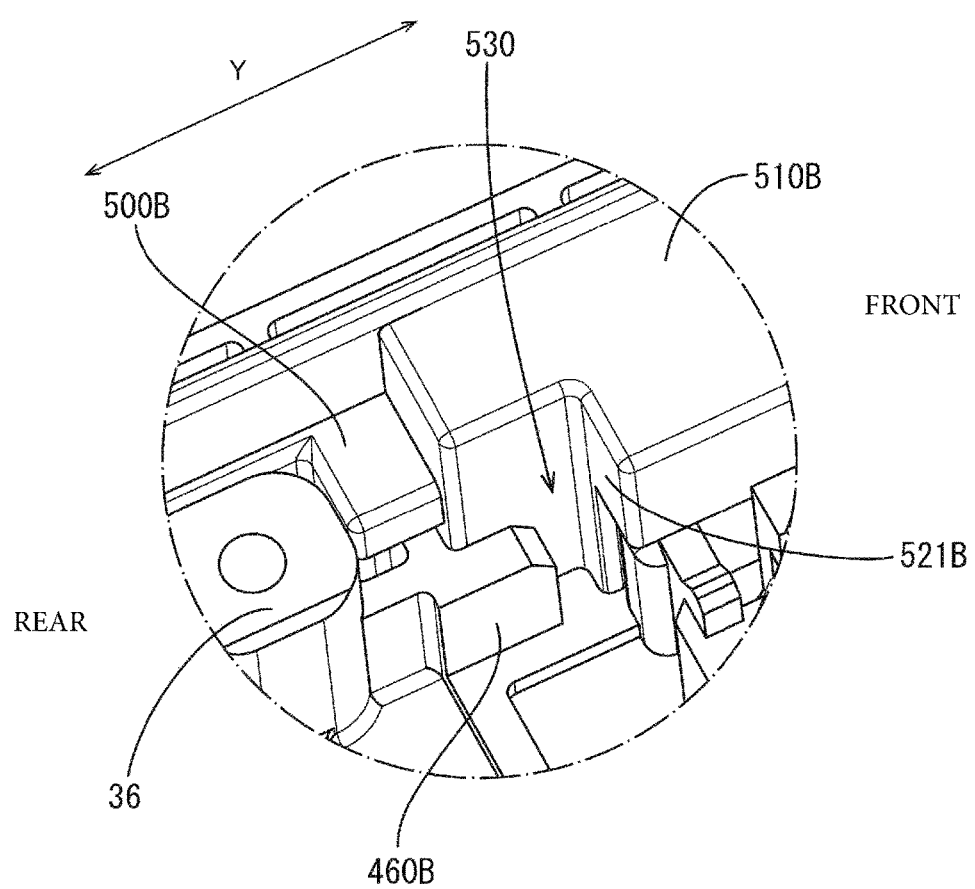
FIG. 28 is an enlarged diagram of an E portion of FIG. 25.
Figure 29:
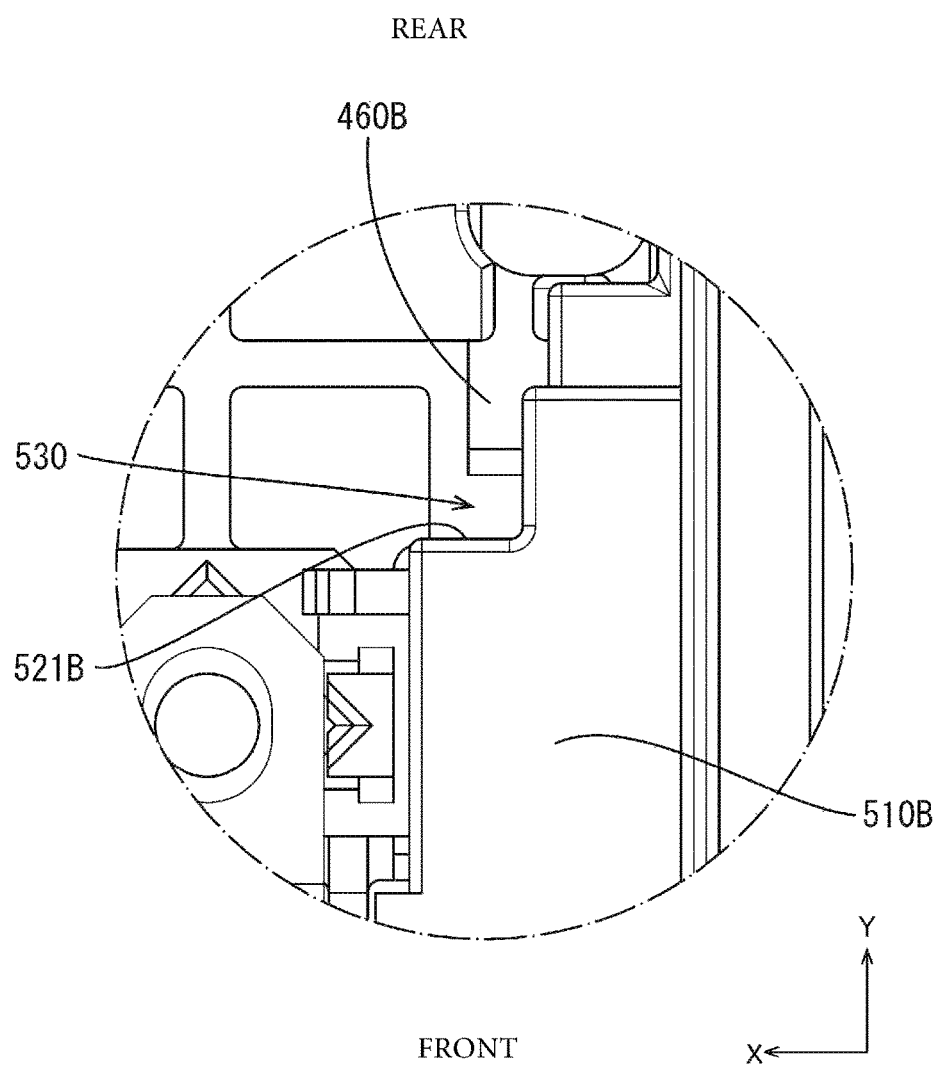
FIG. 29 is an enlarged diagram of an F portion of FIG. 26.

As shown in FIGS. 25 and 26, rear portions of the second walls 510A and 510B have a step shape, and the longitudinal walls 460A and 460B of the coil rest 32 are located inside the stepped portions. Inner rear surface walls 521A and 521B of the second walls 510A and 510B face the longitudinal walls 460A and 460B in the Y-direction (the front-rear direction). As indicated in FIGS. 26, 28, and 29, these longitudinal walls 460A and 560B and the rear surface walls 521A and 521B form positioning grooves 530 between both walls.

Figure 30:
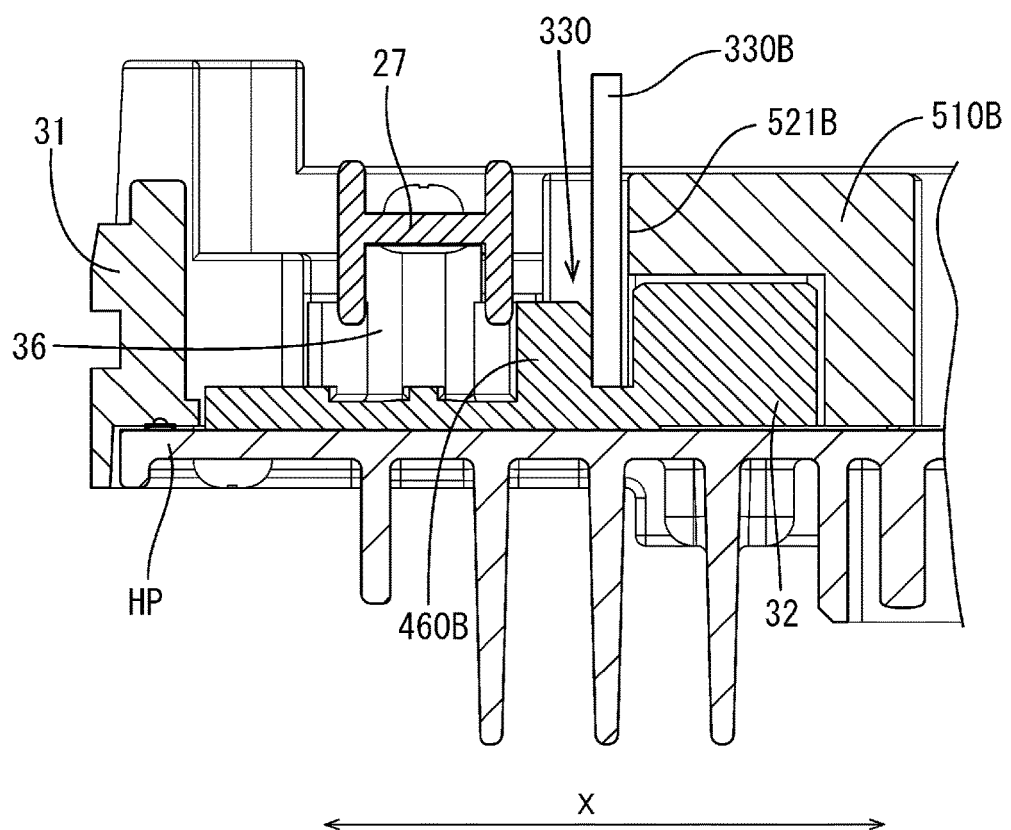
FIG. 30 is a cross-sectional view taken along line G-G of FIG. 27.

As shown in FIGS. 27 and 30, the position in the Y-direction (the front-rear direction) of the coil case 320 is restricted by the side flanges 330A and 330B of the coil case 320 fitting in the positioning grooves 530 on both sides in the X-direction, and the coil case 320 is positioned with respect to the coil rest 32.

As described above, in Embodiment 2, the coil assembly 310 can be positioned with respect to the coil rest 32. Thus, shifting the relative position of the coil assembly 310 to the coil rest 32 can be suppressed. Therefore, since the positions of the fixing holes 35 of the coil rest 32 approximately match the positions of the attaching holes 28 of the fixing portions 27 provided on the coil assembly 310, a screwing operation of fixing the coil assembly 310 to the coil rest 32 can be easily performed.

Positional shifting between the connection terminals 70A and 70B installed on the outer case 30 and the connection portions 17A and 17B of the choke coil 11 can also be suppressed. Thus, a screw fastening operation of connecting these can also be easily performed.

Also, the coil assembly 310 can be positioned in two directions, namely, the X-direction and the Y-direction, and shifting the relative position of the coil assembly 310 to the coil rest 32 can be further suppressed. Therefore, the above-described two screwing operations can be more easily performed.

The coil assembly 310 is positioned using the flange 330 formed on the opening end portion of the coil case 320. Thus, the coil case 320 can be reinforced and positioned at the same time.

Other Embodiments

A technique disclosed in the present specification is not limited to the above description and the embodiments described with reference to the drawings, and includes various modes as follows, for example.

(1) Although an example using a pair of PQ cores as the magnetic core 12 has been described in Embodiment 1 above, other magnetic cores such as a pair of E cores and a pair of pot-cores may be used.

Figure 32:
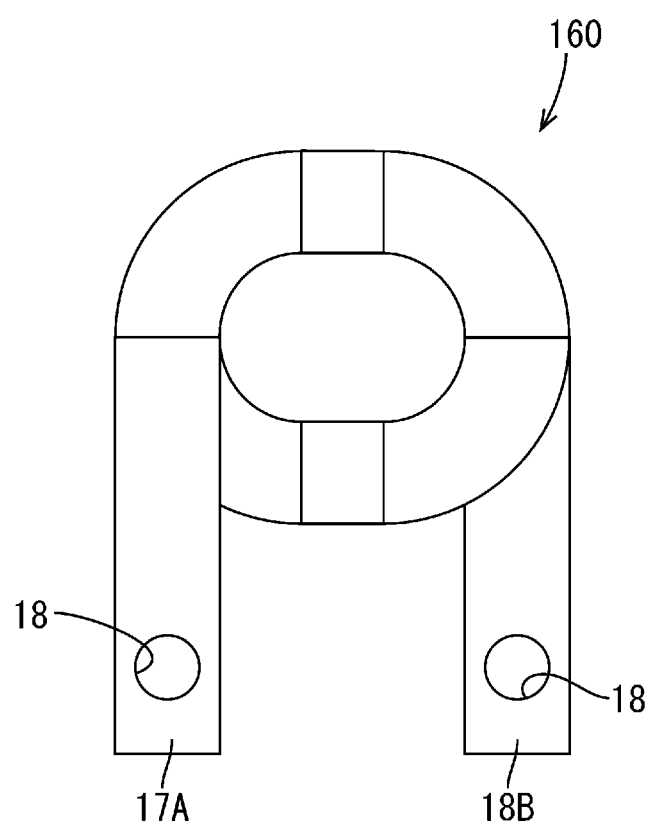
FIG. 32 is a plan view indicating another embodiment of an edgewise coil.

(2) Also, the coil is not limited to the edgewise coil 16, and another coil may be used. The coil shape is not limited to a circular shape, and it may also be an oval shape or an elliptic shape, such as the edgewise coil 160 shown in FIG. 32, for example. The size of a coil can be reduced by using an oval coil or an elliptic coil.

(3) The abutting ribs 26 of the coil case 20 need not to be provided.

(4) The positioning protrusions 25B of the coil case 20 need not to be provided.

(5) The fixing portions 27 formed integrally with the coil case 20 have been described as an example of the "fixing portion" in Embodiment 1 above. The fixing portion may be configured separately from the coil case 20 as long as it has elasticity. Also, the material for the fixing portion is not limited to a resin material, and the fixing portion may also be made of metal such as spring steel.

(6) An example in which the coil assembly 10 is attached to the coil rest 32 of the outer case 30 has been described in Embodiment 1 above. A target for attaching the coil assembly 10 is not limited to the outer case 30 or the coil rest 32, and there is no particular limitation as long as it is a resin member made of a resin.

(7) Although Embodiment 1 above has a configuration in which the coil rest 32 is provided separately from the outer case 30 and the square nuts 51 are held on the coil rest 32, a configuration is possible in which the square nuts 51 are held by the outer case 30 provided integrally with the coil rest 32.

(8) Although Embodiment 1 above has a configuration in which the square nuts 51 are installed at an inclination angle of 45 degrees relative to the direction in which the connection portions 17A and 17B of the coil assembly 10 extend, the inclination angle is not limited to 45 degrees, and the square nuts 51 may also be installed at another angle. In short, it is sufficient that the inclination angle is an angle at which the corners of the square nuts 51 can be held.

(9) The structure of holding the square nuts 51 is not limited to the above-described embodiments.

(10) Embodiment 1 above has a configuration in which the outer case 30 includes the frame body 31 and the coil rest 32. An example in which the coil assembly 10 is attached to the coil rest 32 of the outer case 30 has been described. The coil assembly 10 is not limited to being attached using the coil rest 32, and the coil assembly 10 may have a configuration in which an attachment portion is provided on the outer case 30 or the frame body 31 and the coil assembly 10 is directly attached to the outer case 30 or the frame body 31.

(11) Embodiment 2 above has a configuration in which the coil assembly 310 is positioned on the coil rest 32 using the flange 330 formed on the outer surface of the coil case 320. The positioning method is not limited to a method using the flange 330, and a structure may be applicable in which a positioning portion (a protrusion or a rib, for example) provided separately from the flange 330 is fitted in a portion of the coil rest 32 or the frame body 31.

(12) Although an example in which the coil assembly 310 is positioned with respect to the coil rest 32 in two directions, namely, the X-direction and the Y-direction, is shown in Embodiment 2 above, a structure may be applicable in which the coil assembly 310 is positioned in one of the two directions.

(13) Also, although Embodiment 2 has a structure in which the left and right side flanges 330A and 330B formed on the coil case 320 are respectively fitted in the left and right positioning grooves 530 of the coil rest 32, positioning in the Y-direction of the coil case 320 may be performed using only one of the side flanges 330A and 330B and the positioning groove 530.

The invention claimed is:

1. A coil assembly comprising:
a coil unit in which a coil obtained by winding a winding wire is disposed around a magnetic core;
a coil case having a pair of side walls, a bottom wall and a rear wall that accommodates the coil unit, wherein the coil unit is seated on the bottom wall and is disposed between the pair of side walls; and
a potting material with which an inside of the coil case is filled, wherein the coil case has an elastic fixing portion that is attachable to a resin member to which the coil case is to be placed upon and fixed.

2. The coil assembly according to claim 1, wherein
the coil case has a positioning portion for positioning with respect to the resin member, the positioning portion is a flange disposed on at least one of the pair of side walls and the bottom wall of the coil case and the positioning portion is provided on the opening end of the coil case opposite the rear wall.

3. The coil assembly according to claim 2, wherein
the flange of the bottom wall has a recess that fits in the resin member.

4. The coil assembly according to claim 1, wherein
the elastic fixing portion is provided integrally with the coil case.

5. The coil assembly according to claim 2, wherein
the magnetic core has a columnar winding portion, the winding wire is a flat wire, and the coil is an edgewise coil obtained by winding the flat wire edgewise around the winding portion.

6. The coil assembly according to claim 1, wherein
the coil assembly is attached to the resin member by fixing the fixing portion to an attachment portion provided on the resin member,
a connection portion that has a rectangular plate shape and is fastened to a counterpart connection portion with a bolt and a square nut is provided on the winding wire of the coil assembly, and
the square nut is installed on the resin member and is inclined relative to a direction in which the connection portion extends.

7. The structure for attaching the coil assembly according to claim 6, wherein
the resin member is a coil rest, and the square nut is held on the coil rest.

8. The structure for attaching the coil assembly according to claim 6, wherein
the resin member is a coil rest, and the fixing portion is attached to the attachment portion provided on the coil rest.

9. An electrical connection box comprising:
a coil assembly having:
a coil unit in which a coil obtained by winding a winding wire is disposed around a magnetic core;
a coil case having a pair of side walls, a bottom wall and a rear wall that accommodates the coil unit, wherein the coil unit is seated on the bottom wall and is disposed between the pair of side walls; and
a potting material with which an inside of the coil case is filled,
wherein the coil case has an elastic fixing portion that is attachable to a resin member to which the coil case is to be placed upon and fixed;
wherein the coil assembly is attached to the resin member by fixing the fixing portion to an attachment portion provided on the resin member,
a connection portion that has a rectangular plate shape and is fastened to a counterpart connection portion with a bolt and a square nut is provided on the winding wire of the coil assembly, and
the square nut is installed on the resin member and is inclined relative to a direction in which the connection portion extends.

10. The coil assembly according to claim 2, wherein
the positioning portion is constituted by flanges provided on a bottom wall of the coil case and a side wall, which is orthogonal to the bottom wall, of the coil case.

11. The coil assembly according to claim 2, wherein
the fixing portion is provided integrally with the coil case.

12. The coil assembly according to claim 3, wherein
the fixing portion is provided integrally with the coil case.

13. The coil assembly according to claim 3, wherein
the magnetic core has a columnar winding portion, the winding wire is a flat wire, and the coil is an edgewise coil obtained by winding the flat wire edgewise around the winding portion.

14. The coil assembly according to claim 4, wherein
the magnetic core has a columnar winding portion, the winding wire is a flat wire, and the coil is an edgewise coil obtained by winding the flat wire edgewise around the winding portion.

15. The structure for attaching the coil assembly according to claim 7, wherein
the resin member is a coil rest, and the fixing portion is attached to the attachment portion provided on the coil rest.

* * * * *